(12) United States Patent
Takeda et al.

(10) Patent No.: US 8,676,409 B2
(45) Date of Patent: Mar. 18, 2014

(54) ELECTRIC BRAKE APPARATUS

(75) Inventors: Hiroki Takeda, Yokohama (JP); Hirotaka Oikawa, Yokohama (JP); Junichi Ikeda, Tokyo (JP); Daisuke Goto, Yokohama (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 83 days.

(21) Appl. No.: 13/069,913

(22) Filed: Mar. 23, 2011

(65) Prior Publication Data

US 2011/0246039 A1    Oct. 6, 2011

(30) Foreign Application Priority Data

Mar. 31, 2010   (JP) .................................. 81952/2010

(51) Int. Cl.
    *B60T 8/172*       (2006.01)
(52) U.S. Cl.
    USPC .......................................................... 701/7
(58) Field of Classification Search
    USPC .......................................................... 701/70
    See application file for complete search history.

(56) References Cited

U.S. PATENT DOCUMENTS

| | | | |
|---|---|---|---|
| 6,253,141 B1 * | 6/2001 | McCann ........................ 701/71 |
| 6,360,150 B1 | 3/2002 | Fukushima et al. | |
| 6,464,308 B2 * | 10/2002 | Kubota ........................... 303/20 |
| 6,679,355 B2 * | 1/2004 | Suzuki ........................... 188/71.9 |
| 7,424,937 B2 * | 9/2008 | Henry et al. ................... 188/156 |
| 7,565,954 B2 | 7/2009 | Kawahara et al. | |
| 7,925,408 B2 * | 4/2011 | Shiraki ........................... 701/70 |
| 2005/0035653 A1 * | 2/2005 | Godlewsky et al. ..... 303/122.03 |
| 2005/0194836 A1 * | 9/2005 | Simpson et al. ................ 303/20 |
| 2007/0052289 A1 * | 3/2007 | Nilsson et al. ................. 303/20 |
| 2008/0059023 A1 * | 3/2008 | Ueno et al. ..................... 701/36 |
| 2010/0049416 A1 * | 2/2010 | Harada ........................... 701/81 |

FOREIGN PATENT DOCUMENTS

| | | |
|---|---|---|
| JP | 2000-16279 | 1/2000 |
| JP | 2000-25594 | 1/2000 |
| JP | 2003-175811 | 6/2003 |
| JP | 2003-202042 | 7/2003 |
| JP | 2007-161154 | 6/2007 |
| JP | 2008-184023 | 8/2008 |

OTHER PUBLICATIONS

Office Action mailed Oct. 9, 2013 in corresponding Japanese patent application No. 2010-081952 with partial English translation.

* cited by examiner

*Primary Examiner* — Thomas Tarcza
*Assistant Examiner* — Alex C Dunn
(74) *Attorney, Agent, or Firm* — Wenderoth, Lind & Ponack, LLP

(57) ABSTRACT

Even when a rigidity table stored in a RAM at the time of a start of a brake operation does not coincide with an actual rigidity characteristic of an electric caliper which changes according to brake conditions including how often and how long a brake operation is applied, it is possible to reduce a deviation between a pressing force instruction value and a generated pressing force by updating the characteristic of the relation between a pressing force instruction value and rotational position each time an estimated thrust force value is calculated during one brake operation. It is possible to steadily keep followability to a pressing force instruction according to an actual state of the rigidity characteristic of the electric caliper, thereby ensuring generation of an appropriate brake force.

20 Claims, 12 Drawing Sheets

(a)

(b)

ELECTRIC BRAKE APPARATUS

BACKGROUND OF THE INVENTION

1. Field of the Invention

The present invention relates to an electric brake apparatus used in braking a vehicle.

2. Description of the Related Art

For example, Japanese Patent Application Public Disclosure No. 2007-161154 discloses an electric brake apparatus capable of updating a rigidity table, which indicates the rigidity characteristic of a caliper and brake pads after completion of one brake operation, more specifically, for example, after completion of one brake operation from pressing of a brake pedal to a release of the brake pedal.

One drawback of the above-described conventional art is that this electric brake apparatus may be unable to reflect a change in the rigidity of the caliper and the brake pads during one brake operation, which leads to generation of an excessive or insufficient brake force relative to a brake instruction such as an operation amount of the brake pedal depending on the degree of the change in the rigidity.

SUMMARY OF THE INVENTION

An object of the present invention is to provide an electric brake apparatus capable of ensuring generation of a brake force according to a brake instruction such as an operation amount of a brake pedal.

According to one aspect of the present invention, an electric brake apparatus includes a caliper main body including a pressing member configured to press a brake pad against a disk rotor, an electric motor disposed in the caliper main body and configured to thrust the pressing member, a rotational position detector configured to detect a rotational position of the electric motor, and a controller configured to calculate a supply electric current value used in a control of the electric motor from rigidity characteristic data of the caliper based on a pressing force instruction value for a pressing force applied from the pressing member to the brake pad according to a brake instruction signal. The controller includes a thrust force information calculation unit configured to calculate thrust force information for a thrust force applied to the pressing member at a rotational position of the electric motor which is detected by the rotational position detector, an update unit configured to update rigidity characteristic data of the caliper based on the thrust force information and the rotational position of the electric motor, when the thrust force calculation unit calculates the thrust force information while the pressing member is pressing the brake pad during one brake operation, and an instruction value change unit configured to change an instruction value converted from the pressing force instruction value to calculate the supply electric current value, based on the updated rigidity characteristic data, when the update unit updates the rigidity characteristic data of the caliper.

BRIEF DESCRIPTION OF THE DRAWINGS

FIG. 13(a) illustrates an example when a large difference is generated between the rigidity tables before and after the update, and FIG. 13(b) illustrates an example of limiting a change amount of the motor rotational position instruction.

DETAILED DESCRIPTION OF THE INVENTION

[Configuration of Electric Brake Apparatus]

Figure 1:
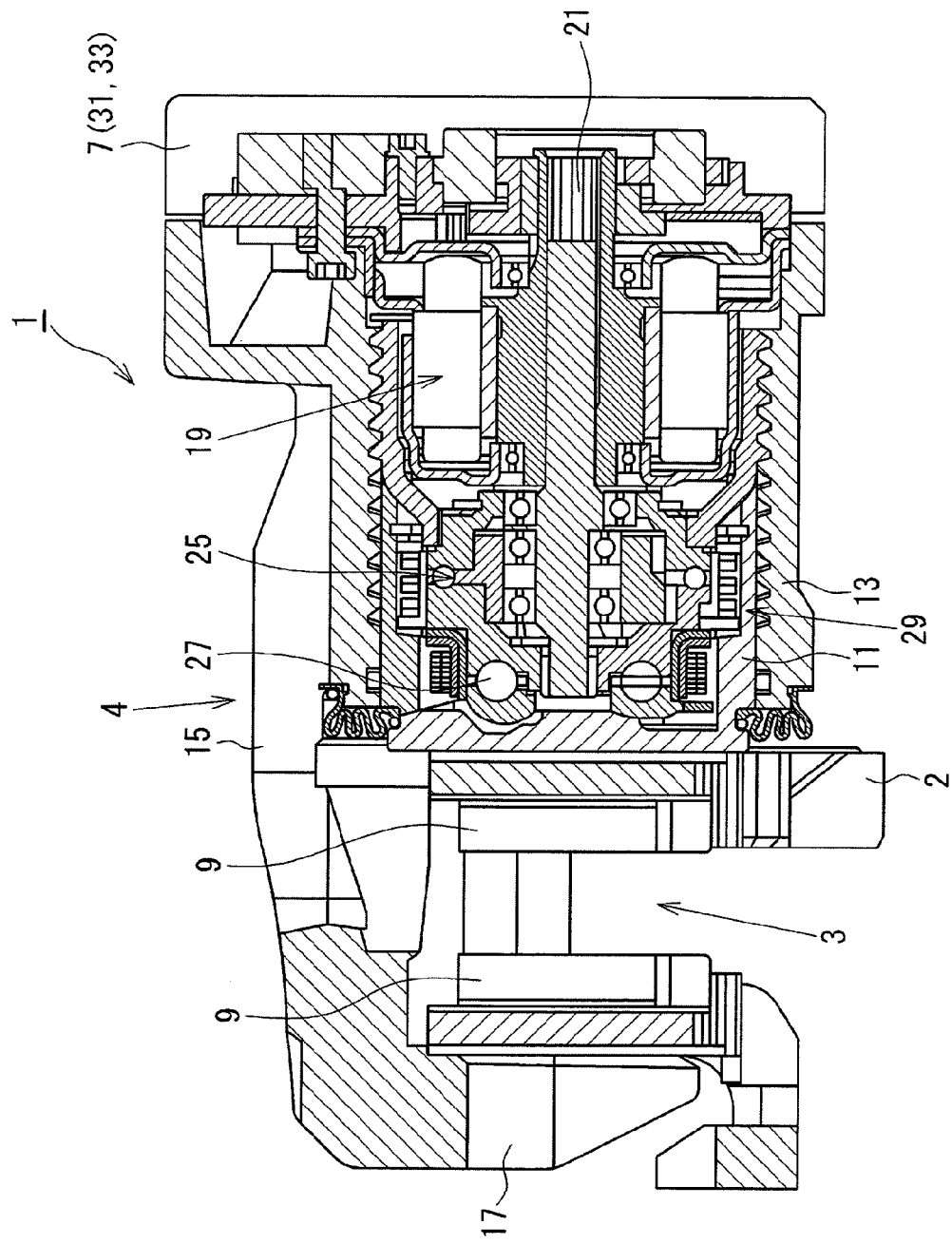
FIG. 1 is a cross-sectional view of an electric caliper of an electric disk brake system according to a first embodiment of the present invention.
Figure 2:
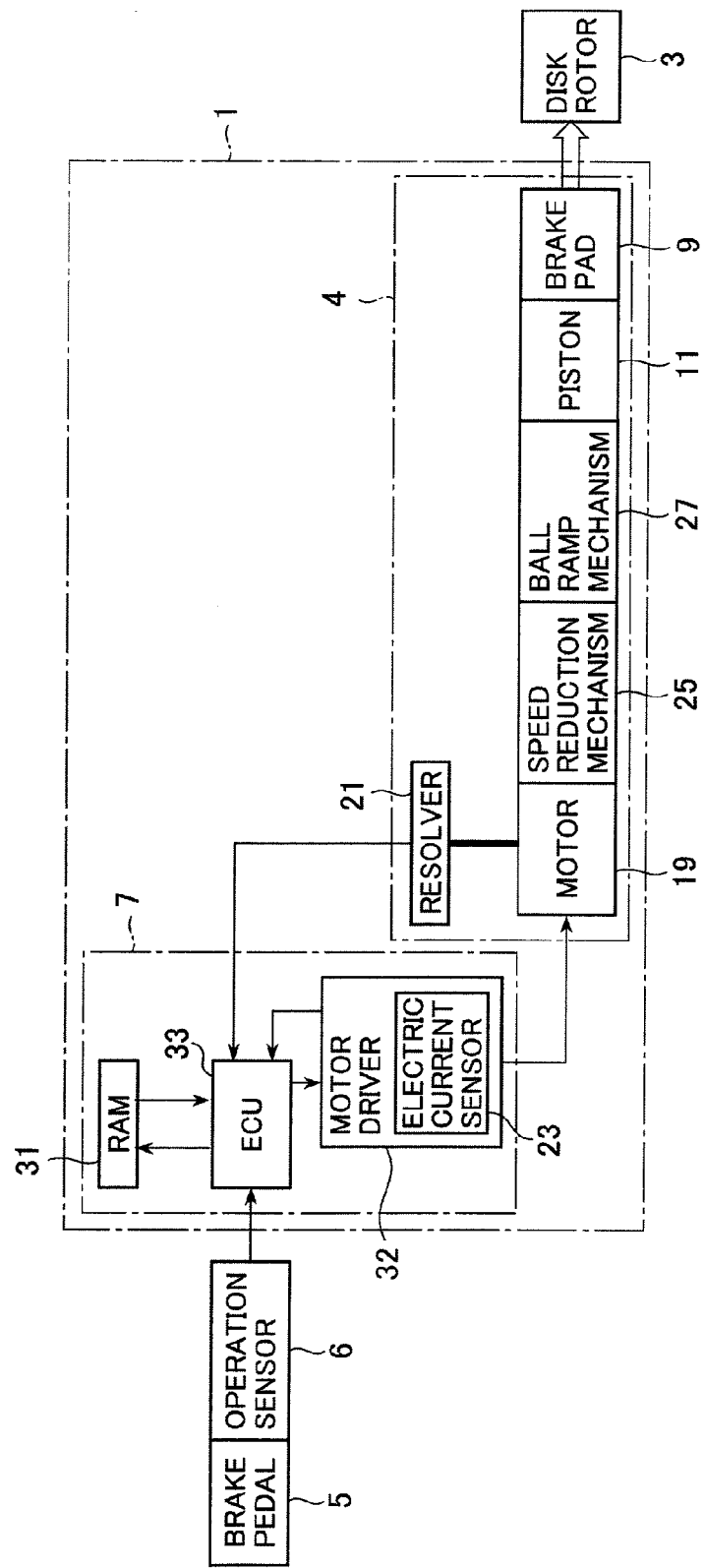
FIG. 2 is a block diagram schematically illustrating the electric disk brake system shown in FIG. 1.

Hereinafter, an electric brake apparatus according to a first embodiment of the present invention will be described with reference to the accompanying drawings. In the present embodiment, the electric brake apparatus is embodied by an electric disk brake system 1. Referring to FIGS. 1 and 2, the electric disk brake system 1 includes an electric caliper 4 supported by a carrier 2 fixed to a non-rotational portion of a vehicle body so as to be movable in the axial direction of a disk rotor 3, an operation sensor 6 configured to detect an operation amount of a brake pedal 5 to output information (hereinafter referred to as "pedal operation information") indicating the operation amount and an operation force applied to the brake pedal 5, and a controller 7 which is an exemplary embodiment of a controller of the present invention. The operation sensor 6 may be embodied by arbitrarily selected one of appropriate sensors such as a pressing force sensor configured to detect a pressing force applied to the brake pedal 5, and a stroke sensor configured to detect a rotational amount or a linear movement amount of the brake pedal 5. The pedal operation information (information indicating an operation amount and an operation force applied to the brake pedal 5) corresponds to a brake instruction signal. The brake instruction signal may be embodied by a signal for applying a brake force from a vehicle posture control apparatus or a regenerative control apparatus, instead of the above-mentioned pedal operation information.

The electric caliper 4 includes a caliper body 15. The caliper body 15 is constituted by a cylinder portion 13 containing a piston 11 serving as a pressing member for pressing brake pads 9 against the disk rotor 3, and a claw portion 17 extending over the disk rotor 3 from the cylinder portion 13. The cylinder portion 13 contains an electric motor 19, a resolver 21, a speed reduction mechanism 25, a ball ramp mechanism 27, and a pad wear compensation mechanism 29 installed in the cylinder portion 13. The resolver 21 detects a rotational position of the electric motor 19, more specifically, a rotational position of a rotor of the electric motor 19, thereby serving as a rotational position detector. The speed reduction mechanism 25 increases a motor torque by slowing down a rotation of the electric motor 19. The ball ramp mechanism 27 moves the piston 11 by receiving a rotation of the electric motor 19 through the speed reduction mechanism 25 and converts the rotation into a linear motion. The pad wear compensation mechanism 29 changes the position of the piston 11 according to wear of the brake pads 9, thereby compensating the pad wear. Thus-configured internal components in the cylinder portion 13 causes the piston 11 to apply a pressing force to one of a pair of brake pads 9 (the brake pad 9 on the right side as viewed in FIG. 1) by being moved forward by the electric motor 19 through the ball ramp mechanism 27 and the speed reduction mechanism 25. The present embodiment employs the ball ramp mechanism 27 as a means for converting a rotation of the electric motor 19 into a linear motion, i.e., a so-called rotation/linear motion conversion mechanism. However, the rotation/linear motion conversion mechanism is not limited thereto, and may be embodied by any another mechanism capable of converting a rotation into a linear motion, such as a ball screw mechanism, a precision roller screw mechanism, and a rack-and-pinion mechanism.

Figure 6:
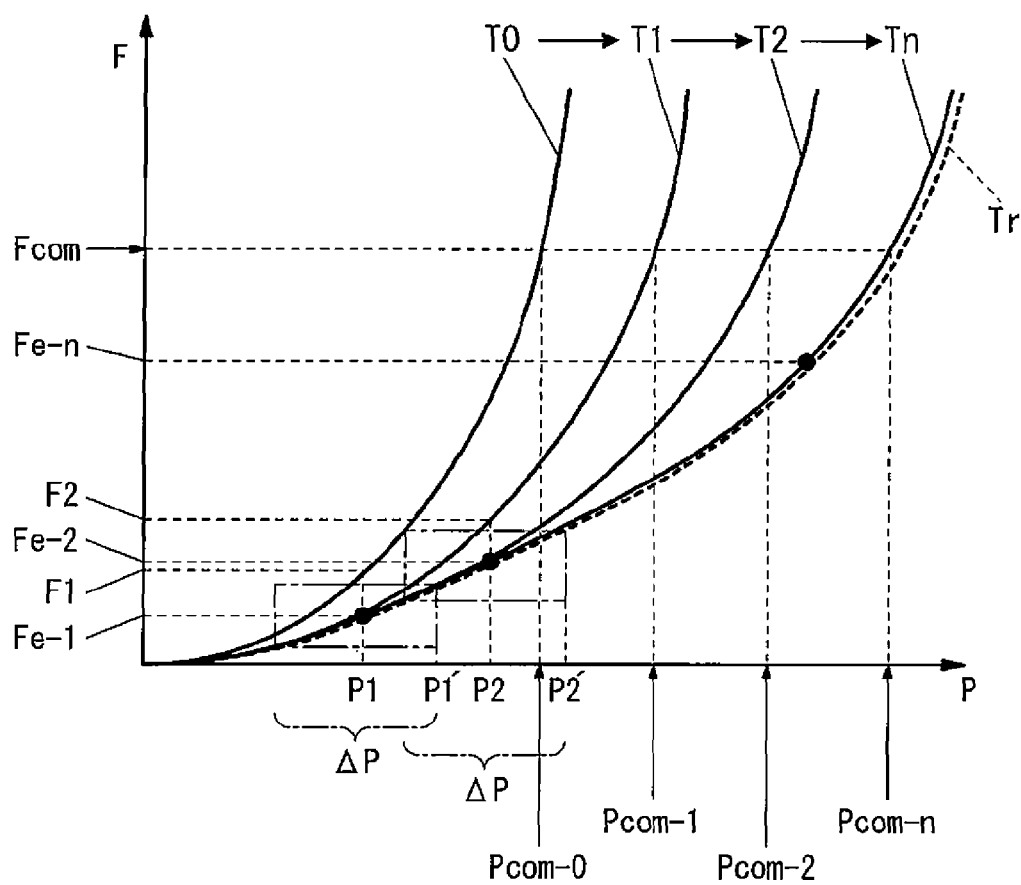
FIG. 6 illustrates the method of updating the rigidity table according to the embodiment.

As shown in FIG. 2, the controller 7 includes a motor driver 32 for supplying electric current to the electric motor 19, a RAM 31, and an ECU 33. The ECU 33 receives an input of pedal operation information from the operation sensor 6 as a brake instruction signal, and thereby controls a pressing force applied to the brake pads 9 due to the electric motor 19 and therefore the piston 11 through the motor driver 32 based on the operation amount of the brake pedal 5 indicated by the pedal operation information. The motor driver 32 is constituted by an inverter circuit, and contains a built-in electric current sensor 23 configured to detect electric current supplied to the electric motor 19. The RAM 31 stores a rigidity table as rigidity characteristic data which will be described later. The rigidity table indicates the relation between a pressing force instruction value based on the pedal operation information and a rotational position of the above-mentioned electric motor 19, and corresponds to a characteristic of the relation between the pressing force and rotational position. In the present embodiment, for example, as shown in FIG. 6, the rigidity table is expressed in the form of a graph in which the horizontal axis represents the rotational position of the electric motor, and the vertical axis represents the pressing force instruction value. In the present embodiment, the pressing force instruction (pressing force instruction value) is converted into a motor rotational position instruction value. However, the pressing force instruction value may be replaced with an electric current instruction value or a motor torque instruction value contributive to generation of a pressing force, which will be described later in detail as another embodiment.

[Functional Configuration of ECU]

Figure 3:
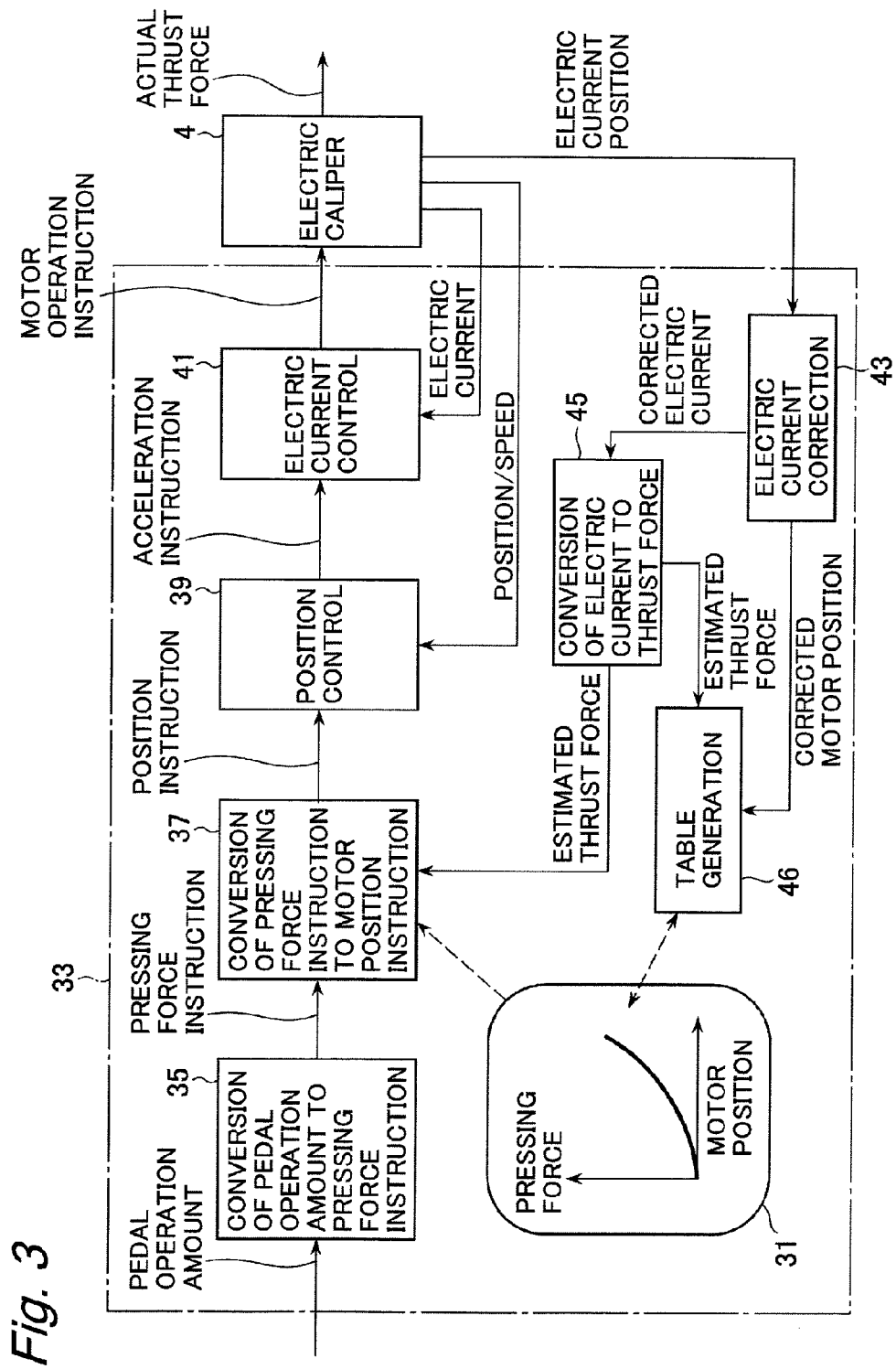
FIG. 3 is a functional block diagram of an ECU shown in FIG. 2 for illustrating a control method of the electric disk brake system shown in FIG. 1.

FIG. 3 illustrates functional blocks in the ECU 33.

Referring to FIG. 3, the ECU 33 includes a pedal-operation-amount-to-pressing-force-instruction-conversion processor 35, a pressing-force-instruction-to-motor-rotational-position-instruction-conversion processor 37, a position control processor 39, an electric current control processor 41, an electric current correction processor 43, an electric-current-to-thrust-force-conversion processor 45, and a rigidity table generation processor 46. In the ECU 33, these processors function to generate a motor operation instruction for the electric motor 19 from the pedal operation information, i.e., calculate a supply electric current value to the electric motor 19 from a pressing force instruction value, so as to supply electric current to the electric motor 19 accordingly.

The pedal-operation-amount-to-pressing-force-instruction-conversion processor 35 converts a brake instruction signal, which is entered pedal operation amount, into a pressing force instruction value according to a preset conversion coefficient, and outputs the converted pressing force instruction value to the pressing-force-instruction-to-motor-rotational-position-instruction-conversion processor 37. The pressing-force-instruction-to-motor-rotational-position-instruction-conversion processor 37 converts this pressing force instruction value to a motor rotational position instruction value based on the rigidity table stored in the RAM 31, and outputs the converted motor rotational position instruction value to the position control processor 39. This pressing-force-instruction-to-motor-rotational-position-instruction-conversion processor 37 outputs, to the position control processor 39, a motor rotational position instruction value converted based on the rigidity table stored in the RAM 31 at that time, each time the processor 37 receives an input indicating that an estimated thrust force value is detected from the electric-current-to-thrust-force-conversion processor 45, which will be described later.

The position control processor 39 calculates an acceleration instruction value based on a difference between a motor rotational position detected by the resolver 21 and the motor rotational position instruction value output from the pressing-force-instruction-to-motor-rotational-position-instruction-conversion processor 37, and outputs the calculated acceleration instruction value to the electric current control processor 41. The position control processor 39 calculates the above-mentioned acceleration instruction value with use of, for example, a PID control or an observer. The electric current control processor 41 calculates a motor operation instruction value, which is a supply electric current value corresponding to the acceleration instruction value, and supplies electric current based on the motor operation instruction value to the electric motor 19 in the electric caliper 4. Further, the electric current control processor 41 applies a feed-back control to the motor operation instruction value based on a supplied electric current detection value of the motor 19 which is received from the electric current sensor 23. The electric current control processor 41 calculates the above-mentioned motor operation instruction by a calculation based on a motor torque constant and an inertial moment.

The caliper 4 operates by receiving the motor operation instruction value from the electric current control processor 41. Then, the displacement of the motor rotational position caused by the operation of the caliper 4 is measured by the resolver 21, and a q-axis current value, which is electric current actually flowing through the motor, is measured by the electric current sensor 23. The information (hereinafter referred to as "motor rotational position information") indicating the displacement of the motor rotational position (hereinafter also referred to as "motor rotational position"), and the information (hereinafter referred to as "motor electric current information") indicating the q-axis current of the motor are input into the electric current correction processor 43 of the ECU 33.

Figure 5:
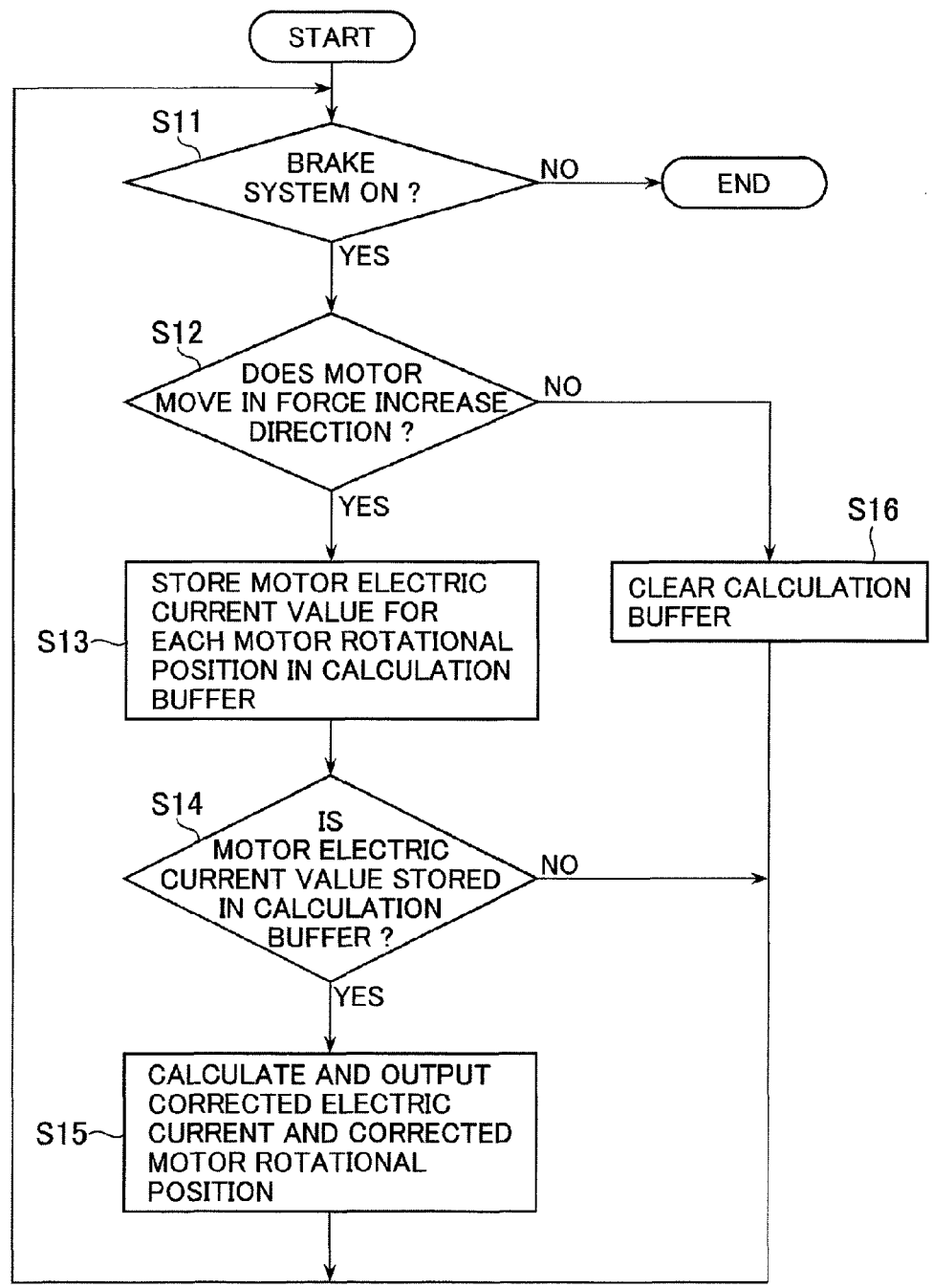
FIG. 5 illustrates the method of updating the characteristic of a relation between a pressing force instruction vale and a rotational position (rigidity table).

The electric current correction processor 43 of the ECU 33 receives the above-mentioned motor rotational position information, and calculates a motor speed and a motor acceleration. The processor 43 calculates the motor speed and the motor acceleration based on a temporal change amount of the motor rotational position indicated by the motor rotational position information. Further, the electric current correction processor 43 performs electric current correction processing by using the motor rotational position obtained from the motor rotational position information, the motor speed and the motor acceleration obtained as mentioned above, and the q-axis current value of the motor obtained from the motor electric current information. This electric current correction processing includes calculating corrected electric current as electric current required to thrust the piston by subtracting electric current for an acceleration torque, mechanical friction, and viscosity resistance. Further, the electric current correction processing includes calculating a corrected motor rotational position by subtracting a predetermined amount from the motor rotational position information as the motor rotational position corresponding to the above-mentioned corrected electric current, since just the above-mentioned corrected electric current does not correspond to the motor rotational position information. The corrected electric current and the corrected motor rotational position obtained by these kinds of electric current correction processing are output to the electric-current-to-thrust-force-conversion processor 45, and the rigidity table generation processor 46, respectively. The above-mentioned electric current correction processing is performed as illustrated in the flowchart of FIG. 5, and will be described later in detail.

The electric-current-to-thrust-force-conversion processor 45 calculates an estimated thrust force value which is thrust force information from the corrected electric current output from the electric current correction processor 43. The electric-current-to-thrust-force-conversion processor 45 calculates the estimated thrust force value based on a motor torque constant and the mechanical efficiency of the caliper 4 obtained by pre-measurement. The electric current correction processor 43 and the electric-current-to-thrust-force-conversion processor 45 are an embodiment of a thrust force information calculator. The calculated estimated thrust force value is output from the electric-current-to-thrust-force-conversion processor 45 to a rigidity table generation processor 46 and the pressing-force-instruction-to-motor-rotational-position-instruction-conversion processor 37.

The rigidity table generation processor 46 generates an updated rigidity table as will be described later at the timing when the estimated thrust force value is calculated, with use of the estimated thrust force value, which is thrust force information obtained by the electric-current-to-thrust-force-conversion processor 45, and the corrected motor rotational position obtained by the electric current correction processor 43. In this way, the rigidity table generation processor 46 changes the rigidity table which is rigidity characteristic data stored in the RAM 31 into an updated rigidity table.

[Brake Operation by Electric Brake Apparatus]

The present embodiment generates a brake force according to driver's operation of the brake pedal 5 when the brake apparatus 1 is in a initial state maintaining a predetermined distance between the brake pads 9 and the disk rotor 3, releases the brake force, and measures the motor rotational position information of the electric motor 19 and the motor electric current information of the electric motor 19 (electric current supplied to the electric motor 19), generally in the following manner.

When a driver operates the brake pedal 5, the operation sensor 6 converts the pedal operation amount into the pedal operation information, and the ECU 33 outputs a motor operation instruction value as a supply electric current value based on this brake instruction signal. When the electric motor 19 is actuated to operate by the motor operation instruction value, this power is transmitted to the speed reduction mechanism 25 shown in FIG. 1, and the piston 11 is displaced by the ball ramp mechanism 27 to the left as viewed in FIG. 1. This displacement of the piston 11 causes one of the brake pads 9 to be pressed against the disk rotor 3, the reactive force of which causes the caliper 4 to be displaced and thereby the claw portion 17 of the caliper 4 to press the other of the disk pads 9 against the disk rotor 3. Sandwiching the disk rotor 3 by the pair of brake pads 9 from the both sides of the disk rotor 3 generates a brake force applied to the vehicle. At this time, the resolver 21 measures the rotational displacement amount of the electric motor 19, and the electric sensor 23 measures the electric current actually flowing through the electric motor 19. The ECU 33 repeatedly updates the rigidity table reflecting the rigidity of the caliper 4 based on the measured motor rotational position information and motor electric current information of the electric motor 19, and the electric motor 19 is repeatedly driven by a supply electric current value calculated based on the updated rigidity table during one brake operation. When the driver releases the brake pedal 5, the brake pads 19 return to initial positions, thereby releasing the brake force.

[Details of Control of Electric Brake Apparatus]

Figure 4:
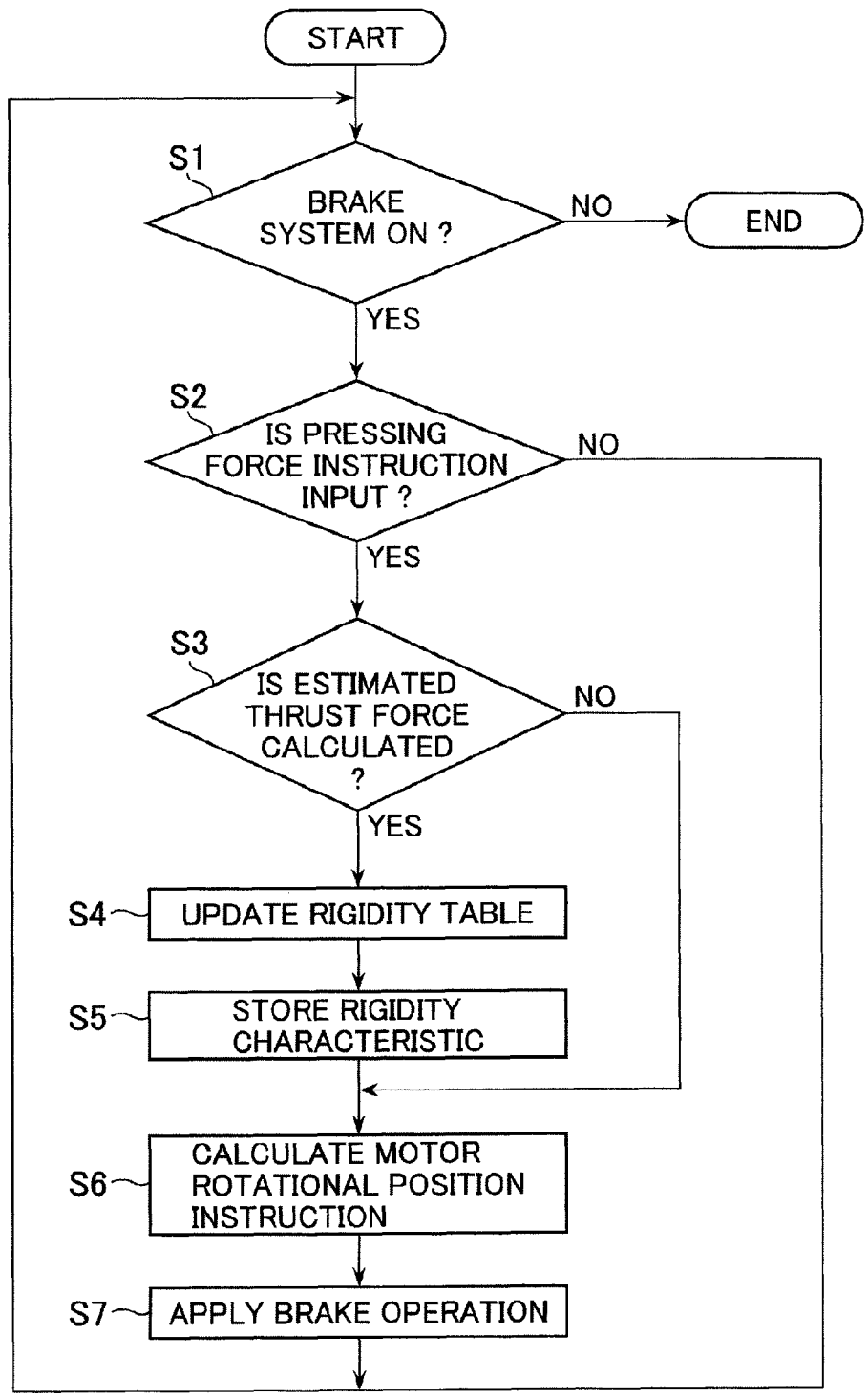
FIG. 4 is a flowchart illustrating a method of updating a rigidity table which is performed by the ECU shown in FIG. 2.

The present embodiment performs a control as shown in FIG. 4 to realize the above-described brake operation. First, it is determined whether the electric disk brake system 1 (hereinafter referred to as "brake system") is in an ON state (step S1). If it is determined in step S1 that the brake system is not in an ON state (No), the processing is ended. It should be noted that the brake system is turned on when a brake instruction signal is input into the ECU 33. This timing includes not only when a driver operates the brake pedal 5 and pedal operation information is input from the operation sensor 6, but also when the vehicle posture control apparatus or other controller mounted on the vehicle outputs a brake signal. The processing shown in the present flowchart is repeatedly performed until the brake system is turned off after being turned on, i.e., until one brake operation is finished.

If it is determined in step S1 that the brake system is turned on (Yes), then it is determined whether (Yes) or not (No) a pressing force instruction value is input into the pressing-force-instruction-to-motor-rotational-position-instruction-conversion processor 37 (step S2). If it is determined in step S2 that a pressing force instruction value is input into the pressing-force-instruction-to-motor-rotational-position-instruction-conversion processor 37 (Yes), it is then determined whether (Yes) or not (No) the electric-current-to-thrust-force-conversion processor 45 calculates an estimated thrust force value (step S3).

In an initial stage of a brake operation, since no estimated thrust force value is calculated, the processing proceeds to step 6 after step 3. In step 6, the motor rotational position instruction value for operating the electric motor 19 is obtained from the rigidity table stored in the RAM 31. Then, the operation of the electric motor 19 is controlled by supplying the supply electric current value based on the motor rotational position instruction calculated in step S6 through the position control processor 39 and the electric current control processor 41 shown in FIG. 3. A thrust force is applied to the piston 11 according to this operation of the electric motor 19 so that the electric caliper 4 starts to generate a brake force (step S7), and then the processing returns to step S1.

When the electric disk brake system starts to generate a brake force, the above-mentioned motor rotational position information and the motor electric current information start to be input into the electric current correction processor 43 of the ECU 33, leading to a start of calculation of an estimated thrust force value. Therefore, if the electric-current-to-thrust-force-conversion processor 45 calculates an estimated thrust force value in step S3 (Yes), the rigidity table generation processor 46 generates and updates the rigidity table (step S4). The rigidity table updated and generated in step S4 is stored in the RAM 31 (step S5).

After step S5, the motor rotational position instruction value for operating the electric motor 19 is obtained from the updated rigidity table in step S6. Then, a supply electric current value is calculated based on the motor rotational position instruction calculated in step S6, and the operation of the electric motor 19 is controlled accordingly. The electric caliper 4 continues to generate a brake force according to this operation of the electric motor 19 (step S7), and subsequently, the processing returns to step S1. An instruction value change unit is embodied by the processing of step S6.

In this way, the rigidity table is updated and generated each time an estimated thrust force is calculated, for example, during one brake operation from pressing of the brake pedal 5 to a release of the brake pedal 5. Then, eventually, if it is determined in step S1 that the brake apparatus is in an OFF state (No), more specifically, for example, if the driver finishes operating the brake pedal 5 to stop an input of the pedal operation information, the brake control is ended. In this way, due to update and generation of the rigidity table each time an estimated thrust force is calculated during one brake operation, it is possible to reflect a change in the rigidity of the caliper and the brake pads during one brake operation, and to ensure generation of an appropriate brake force according to a brake operation amount.

[Electric Current Correction Processing]

Next, a description will be given with reference to FIG. 5 about a method for calculating a corrected electric current for use in a calculation of an estimated thrust force value as thrust force information in step S3, and a corrected rotational position for use in update and generation of the rigidity table in step S4 (the details of the processing performed by the electric current correction processor 43).

The processing shown in the flowchart of FIG. 5 is carried out in parallel with the processing shown in the above-described flowchart of FIG. 4. The first step is determination whether the brake system is in an ON state (step S11), similarly to step S1 shown in FIG. 4. If it is determined in step S11 that the brake system is not in an ON state (No), the processing is ended.

If it is determined in step S11 that the brake system is in ON state (Yes), an operation of the electric motor 19 causes motor rotational position information to be input into the electric current correction processor 43, which then calculates a motor speed. Next, in step S12, it is determined whether the motor speed obtained from the motor rotational position information exceeds a predetermined threshold value to determine whether the movement direction of the piston 11, i.e., the rotational direction of the electric motor 19 is a force increase direction. This threshold value of motor speed is set so as to prevent incorrect detection of the movement direction of the electric motor 19 in consideration of a noise component generated at the time of calculation of the motor speed. For example, if the noise width of the motor speed is ±30 [r/min], assuming that + (plus) indicates a rotation in the force increase direction, a value equal to or more than +30 [r/min] is set as the threshold value for rotational speed. Then, if the motor speed exceeds the threshold value in step S12, it is determined that the rotational direction of the electric motor 19 is the direction causing the piston 11 to move to the force increase side. This flowchart is being described based on an example in which the electric motor 19 is rotated in the force increase direction, but the processing that will be described below may be performed even when the electric motor 19 is rotated in the force reduction direction. In this case, in step S12, it is determined whether the rotational direction of the electric motor 19 is the force reduction direction.

In step S13, the electric current correction processor 43 filters the noise component of the q-axis current value (hereinafter referred to as "motor electric current value") of the motor electric current information input from the electric current sensor 23 by the speed information and the acceleration information calculated from the motor rotational position information. After that, the electric current correction processor 43 stores, into a calculation buffer, a motor electric current value for each motor rotational position of the motor rotational position information input from the resolver 21. This calculation buffer has a capacity capable of storing motor electric current values for motor rotational positions corresponding to, for example, a certain motor rotational position range, for example, 360° as an electric angle of the electric motor 19, i.e., 1024 pulses output from the resolver 21 in the present embodiment. The calculation buffer is set in the memory region in the RAM 31. The motor electric current values corresponding to the above-mentioned certain motor rotational position range are stored in the calculation buffer, thereby enabling a calculation of corrected electric current by average processing of dividing the total value of the stored motor electric current values by the number of pulses of the resolver 21 corresponding to the certain motor rotational position range. Corrected electric current is calculated by the thus-performed average processing, because the motor electric current value detected by the electric current sensor 23 shows a drastically fluctuating waveform of electric current value under the influence of the periodic change characteristic of the electric motor 19, and it is necessary to eliminate the influence of the periodic change characteristic of the electric motor 19 to extract an electric current value effective to a calculation of a thrust force as a corrected electric current. Further, execution of this average processing in step S13 according to a change in the motor rotational position leads to movement average processing, and thereby it becomes possible to calculate an accurate corrected electric current by a small number of plots.

After step S13, in step S14, it is determined whether the calculation buffer stores motor electric current values corresponding to the certain motor rotational position range (corresponding to 1024 pulses of motor rotational positions output from the resolver 21) back from the present motor rotational position, to determine whether the electric current correction processor 43 can now calculate a corrected motor rotational position and corrected electric current.

If it is determined in step S14 that the electric current correction processor 43 can now calculate a corrected motor rotational position and corrected electric current (Yes), the electric current correction processor 43 calculates corrected electric current and a corrected motor rotational position by the above-mentioned average processing to output them into the electric-current-to-thrust-force-conversion processor 45 and the rigidity table generation processor 46 (step S15). A corrected motor rotational position corresponding to corrected electric current is a rotational position to which the motor has been returned by a predetermined amount from the motor rotational position corresponding to the motor electric current value stored in the last end of the calculation buffer, more specifically, a rotational position which coincides with an average value of the above-described certain motor rotational position range. Since corrected electric current is obtained from the above-mentioned average processing, the motor rotational position corresponding to the calculated corrected electric current is different from the motor rotational position at the moment of the calculation of the corrected electric current. More specifically, referring to FIG. 6, since the corrected electric current and the pressing force are in a proportional relation, the pressing force on the vertical axis in FIG. 6 is interpreted as the corrected electric current just for now. Due to the average processing, the motor electric current values corresponding to a certain motor rotational position range ΔP indicated by a dashed line in FIG. 6 are stored in the calculation buffer at the moment when the motor rotational position is located at the position P1' so that a calculation of a corrected electric current becomes possible. In this case, the motor rotational position corresponding to the corrected electric current indicated by ● is the motor rotational position P1 which is shifted to the initial position side by a half motor rotational position amount of ΔP from the motor rotational position P1'. Further, as shown in FIG. 6, setting of certain motor rotational position ranges ΔP so as to overlap results in movement average processing, enabling an accurate calculation of a corrected electric current by a small number of plots.

In the present embodiment, a value after a subtraction of the rotational position range corresponding to 512 pulses of the resolver 21 (a half of rotational position range corresponding to 1024 pulses of the resolver 21 corresponding to 360° as an electronic angle of the electric motor 19) is calculated as a corrected rotational position. Further, in the present embodiment, corrected electric current is calculated from one execution of the average processing, but corrected electric current may be calculated so as to become more accurate by averaging a plurality of corrected electric current values calculated by the above-mentioned movement average processing. Further, corrected electric current may be calculated with use of the Fourier conversion processing, instead of the average processing.

After this processing of step S15, or if it is determined in step S14 that the electric current correction processor 43 cannot yet calculate a corrected motor rotational position and corrected electric current (No), the processing returns to step S11 to repeat the steps. However, in this next turn, in step S13, electric current values are overwritten from the head address without the values of the calculation buffer cleared.

If it is determined in step S12 that the motor speed does not exceed the threshold value (No), this means that the rotational direction of the electric motor 19 is the direction causing no movement of the piston 11 or a movement of the piston 11 in the force reduction direction. Therefore, the calculation of corrected electric current is unnecessary, and therefore the calculation buffer for calculating a corrected position and corrected electric current is cleared (step S16), and then the processing returns to step S11. In this way, the electric current correction processor 43 (FIG. 3) performs the processing for obtaining corrected electric current required for a calculation of an estimated thrust force value which is thrust force information.

[Details of Control for Updating Rigidity Table]

Next, a description will be given with reference to FIG. 6 about the details of a control when the ECU 33 (controller 7) performs a brake operation while updating the rigidity table.

FIG. 6 shows a general outline of the rigidity table update method. In FIG. 6, the dotted curved line Tr indicates the actual rigidity characteristic of the electric caliper 4 (pressing force characteristics corresponding to positions). The solid curved line T0 indicates the rigidity table stored in the RAM 31. In this way, the rigidity table T0 stored in the RAM 31 and the actual rigidity characteristic Tr of the electric caliper 4 are different because of changes in the rigidity of the frictional materials of the brake pads 9 and the rigidity of the caliper main body 15 due to heat generated during braking applied by the electric caliper 4. For example, such a difference may be generated when the rigidity table T0 is stored while the electric caliper 4 is under a low temperature, but the temperatures of the electric caliper 4 and the brake pads 9 are suddenly increased due to a sudden brake operation.

The rigidity table is updated in the following manner. First, when the pressing-force-instruction-to-motor-rotational-position-instruction-conversion processor 37 of the ECU 33 receives an input of a pressing force instruction value Fcom, the pressing-force-instruction-to-motor-rotational-position-instruction-conversion processor 37 calculates a motor rotational position instruction value based on the rigidity table T0 to obtain a motor rotational position instruction value Pcom-0 which is a value indicating a motor rotational position corresponding to a pressing force (thrust force) of the pressing force instruction value Fcom. The ECU 33 calculates a supply electric current value enabling the motor rotational position of the electric motor 19 to reach the motor rotational position instruction value Pcom-0, and then starts a motor control. When the electric motor 19 operates so that the rotational position thereof reaches the motor rotational position P1', the electric current correction processor 43 can now calculate corrected electric current, and then the electric-current-to-thrust-force-conversion processor 45 calculates an estimated thrust force value Fe-1 as thrust force information based on corrected electric current calculated by the above-mentioned average processing performed by the electric current correction processor 43. At this time, the rigidity table T0 is updated into, for example, T1 (hereinafter also referred to as "rigidity table T1") based on the thrust force value F1 of the rigidity table T0 corresponding to the corrected motor rotational position P1 calculated by the electric current correction processor 43, and the estimated thrust force value Fe-1. The update method at this time will be described later.

When the rigidity table is updated, i.e., when the estimated thrust force value Fe-1 is input into the pressing-force-instruction-to-motor-rotational-position-instruction-conversion processor 37 so that it is determined that the estimated thrust force value is calculated, the pressing-force-instruction-to-motor-rotational-position-instruction-conversion processor 37 recalculates a motor rotational position instruction corresponding to the pressing force instruction Fcom by referring to the rigidity table T1, and changes the motor rotational position instruction value from Pcom-0 to Pcom-1. The ECU 33 calculates a supply electric current value enabling the rotational position of the motor to reach the motor rotational position instruction value Pcom-1, and then starts a motor control accordingly. After that, when the electric motor 19 reaches the position P2' and then an estimated thrust force value Fe-2 is calculated, the rigidity table T1 is updated to, for example, T2 (hereinafter also referred to as "rigidity table T2") with use of the present rigidity table T1 and the estimated thrust forces Fe-1 and Fe-2.

When the rigidity table is updated, the pressing-force-instruction-to-motor-rotational-position-instruction-conversion processor 37 recalculates a motor rotational position instruction value, and changes the motor rotational instruction value from Pcom-1 to Pcom-2. The ECU 33 calculates a supply electric current value enabling the motor rotational position instruction value to reach the motor rotational position instruction value Pcom-2, and then starts a motor control accordingly. In this way, each time an estimated thrust force value as thrust force information is calculated, the ECU 33 updates the rigidity table and updates (and changes) the motor rotational position instruction value, whereby the rigidity table Tn stored in the RAM 31 is becoming coincident with the actual rigidity characteristic Tr of the electric caliper 4 during this one brake operation, and the pressing force generated by the electric motor 19 (caliper 4) is becoming coincident with a desired pressing force realized by the pressing force instruction value Fcom.

As mentioned above, the ECU 33 updates the rigidity table which is rigidity characteristic data, and changes the motor rotational position instruction value (motor rotational position instruction value) according to the updated rigidity table. In the present embodiment, the electric current correction processor 43 and the electric-current-to-thrust-force-conversion processor 45 in the ECU 33 constitutes a thrust force information calculation unit, the rigidity table generation processor 46 constitutes an update unit, and the pressing-force-instruction-to-motor-rotational-position-instruction-conversion processor 37 constitutes an instruction value change unit.

Figure 7:
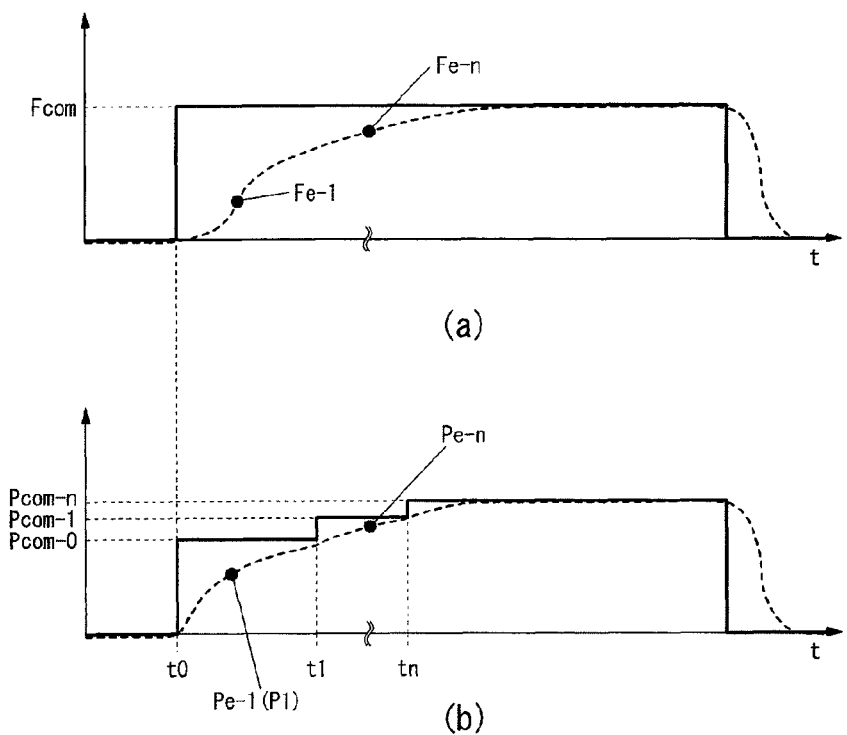
FIGS. 7(a) and (b) are time charts illustrating the pressing force instruction and the rotational position instruction over time, respectively.

Next, the details of the above-described control when the ECU 33 performs one brake operation while updating the rigidity table will be described in chronological order with reference to FIGS. 7(a) and 7(b) in association with FIG. 6. FIG. 7(a) illustrates a change in pressing force (thrust force) over time, and FIG. 7(b) illustrates a change in motor rotational position over time. Further, in FIG. 7, a position control is applied so that the electric motor 19 is rotated to the motor rotational position instruction value which is a target position.

Referring to FIGS. 7(a) and 7(b), at time t0, an input of the pressing force instruction value Fcom into the pressing-force-instruction-to-motor-rotational-position-instruction-conversion processor 37 results in a calculation and output of the motor rotational position instruction value Pcom-0 corresponding to the pressing force instruction value Fcom with use of the rigidity table T0 illustrated in FIG. 6 which is stored in the RAM 31 at this time. Then, at the time (time t1) when the motor rotational position reaches the position P1' illustrated in FIG. 6, the electric-current-to-thrust-force-conversion processor 45 calculates the estimated thrust force value Fe-1 illustrated in FIG. 7(a) based on the corrected electric current calculated by the above-mentioned average processing performed by the electric current correction processor 43. At this time, as shown in FIG. 7(b), the motor rotational position corresponding to the estimated thrust force Fe-1 is the position Pe-1 (corresponding to the position P1 shown in FIG. 6). After that, the rigidity table is updated. At this time, as shown in FIG. 6, when the rigidity table T0 stored in the RAM 31 is updated into the rigidity table T1, the pressing-force-instruction-to-motor-rotational-position-instruction-conversion processor 37 calculates the motor rotational position instruction value Pcom-1 corresponding to the pressing force instruction Fcom with use of the updated rigidity table T1. After that, the calculation of the estimated thrust force value Fe-n and the update of the rigidity table Tn are continued until the motor rotational position reaches the vicinity of the rotation position instruction value Pcom-n. As a result, the rigidity table stored in the RAM 31 is updated into the rigidity table Tn shown in FIG. 6 so as to become more coincident with the actual rigidity characteristic Tr of the electric caliper 4, whereby it is possible to reduce a deviation generated along a change in the rigidity of the electric caliper 4 between a desired pressing force corresponding to the pressing force instruction value and a pressing force actually generated by the electric caliper 4.

[Rigidity Table Update Method]

Next, the rigidity table update method performed by the rigidity table generation processor 46 will be described with reference to FIGS. 8 and 9.

Figure 8:
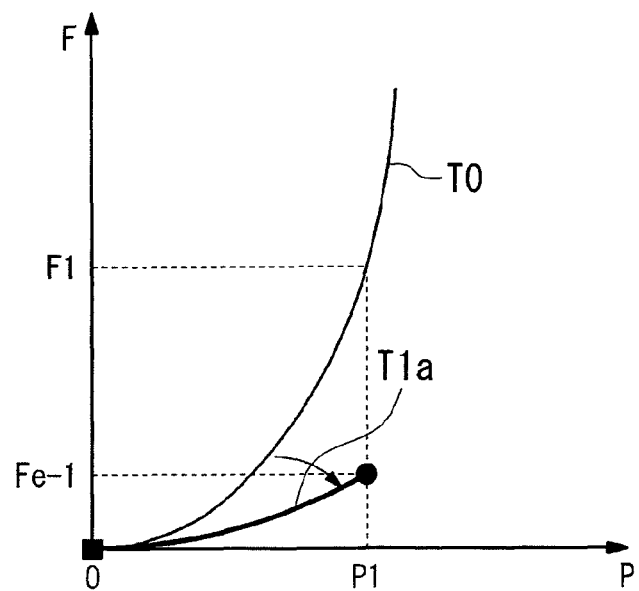
FIG. 8 illustrates the method of updating the rigidity table from an original position of the rigidity table until a position where the estimated thrust force value is calculated.
Figure 9:
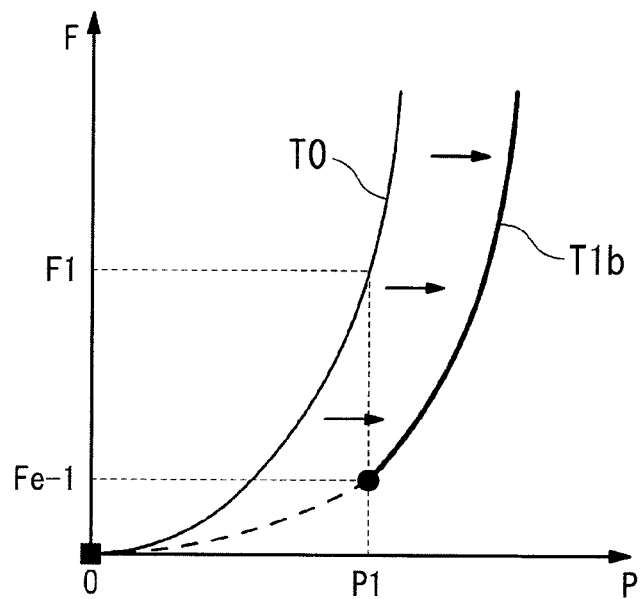
FIG. 9 illustrates the method of updating the rigidity table after the position where the estimated thrust force value is calculated.

FIGS. 8 and 9 show the pressing force-motor rotational position characteristic (hereinafter referred to as "rigidity table"), which serves as rigidity characteristic data, indicated in the form of a graph in which the horizontal axis represents the motor rotational position and the vertical axis represents the pressing force (thrust force). In FIGS. 8 and 9, the thin solid line indicates the rigidity table T0 of the rigidity tables that is used in an initial stage of a brake operation, and the heavy solid line indicates the rigidity table T1 calculated by the update processing. Further, in FIGS. 8 and 9, the mark ■ indicates the original point 0 of the rigidity table, and the mark ● represents the estimated thrust force value. The original point 0 does not indicate the mechanism original point of the motor rotational position but indicates the motor rotational position corresponding to a position when a pressing force starts to be generated.

In the present embodiment, as shown in FIG. 8, when the electric-current-to-thrust-force-conversion processor 45 calculates the estimated thrust force value Fe-1, if the motor rotational position is shifted from the original point 0 of the rigidity table t0 to the corrected motor rotational position pl of the corrected electric current corresponding to the estimated thrust force value, the rigidity table generation processor 46 generates a first half updated rigidity table until the corrected motor rotational position P1 by generating and complementing a curve passing through the estimated thrust force Fe-1 (●) with use of, for example, the polynomial approximation method or the least square method (refer to the heavy line T1a until the corrected motor rotational position P1 shown in FIG. 8).

Further, for a part of the curve after the corrected motor rotational position P1 when the estimated thrust force Fe-1 is calculated, as shown in FIG. 9, the rigidity table generation processor 46 generates a latter half updated rigidity table T1b by complementing it by a horizontal parallel displacement of the characteristic information after the motor rotational position corresponding to the estimated thrust force value Fe-1 in the rigidity table T0 before the update for use in generation of a brake force (electric brake) according to the operation of the electric motor 19. In this way, the rigidity table generation processor 46 generates the updated rigidity table T1 by combining the first half updated rigidity table T1a before the corrected motor rotational position P1 corresponding to the calculated estimated thrust force value Fe-1 shown in FIG. 8, and the latter half updated rigidity table T1b after the corrected motor rotational position P1 corresponding to the calculated estimated thrust force value Fe-1 shown in FIG. 9. Then, the update of the rigidity table is completed by replacement of the rigidity table T0 before the update which is stored in the RAM 31 with this updated rigidity table T1.

[Variation 1 (Rigidity Table Update Method)]

Figure 10:
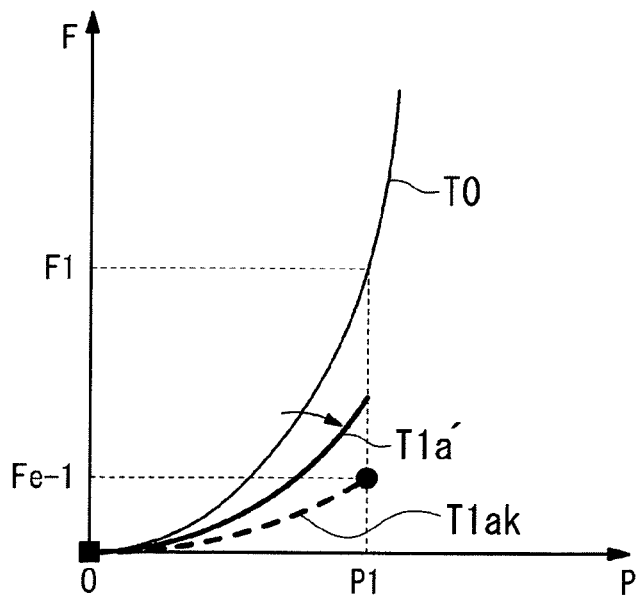
FIG. 10 illustrates a variation 1 of the method of updating the rigidity table performed by the ECU shown in FIG. 2.

The rigidity table generation processor 46 may update the rigidity table by the update method shown in FIG. 10 as a variation 1, instead of the above-described rigidity table update method employed in the present embodiment, which forms the curve until the corrected motor rotational position P1 when the estimated thrust force value Fe-1 is calculated in the above-mentioned manner as shown in FIG. 8. More specifically, a temporary rigidity table T1*ak* (the curve indicated by a dotted line with the mark ● shown in FIG. 10; hereinafter referred to as "temporary first half updated rigidity table T1*ak*") is generated by complementing the rigidity table by the above-mentioned update method as shown in FIG. 8. Then, a first half updated rigidity table T1*a*' is generated by comparing the temporary first half updated rigidity table T1*ak* and the pre-update rigidity table T0, and adjusting a change amount until the generated pressing force at the motor rotational position when the estimated thrust force value Fe-1 is calculated in a shift from the pre-update rigidity table T0 to the temporary first half updated rigidity table T1*ak*, so as to be within a predetermined amount, for example, within 2 [kN]. More specifically, the change amount of the generated pressing force is adjusted so as to be within 2 [kN] at an initial motor rotational position, and within +2 [kN] relative to the first change amount at a next motor rotational position. This adjustment is sequentially repeated until the first half updated rigidity table T1*a*' is generated. The first half updated rigidity table T1*a*' is generated in this way, because use of the temporary first half updated rigidity table T1*ak* in a control of the electric motor 19 may cause an excessive change in brake operation feeling compared to use of the present pre-update rigidity table T0. For example, a sudden change in the pressing force relative to an operation amount of the brake pedal 5 may cause such an excessive change in the brake force that a driver has uncomfortable feeling. This variation 1 adjusts the change rate of the first half updated rigidity table to become less radical, leading to a smooth change in the pressing force relative to an operation amount of the brake pedal 5, thereby enabling prevention of generation of such an excessive change in the brake force that a driver has uncomfortable feeling.

[Variation 2 (Rigidity Table Update Method)]

Figure 11:
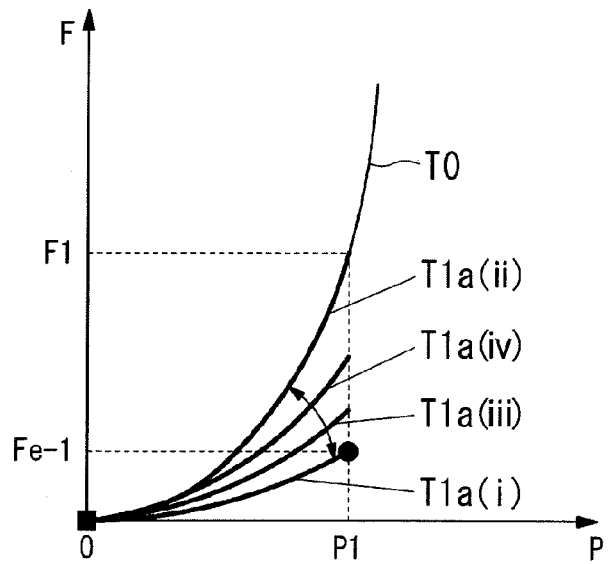
FIG. 11 illustrates a variation 2 of the method of updating the rigidity table performed by the ECU shown in FIG. 2.

Further, the rigidity table generation processor 46 may update the rigidity table by the update method shown in FIG. 11 as a variation 2, instead of the above-mentioned rigidity table update method employed in the present embodiment, which forms the curve until the corrected motor rotational position P1 when the estimated thrust force value Fe-1 is calculated in the above-mentioned manner as shown in FIG. 8. More specifically, the rigidity table generation processor 46 may take into consideration the motor speed and the acceleration calculated from the motor rotational position information when the estimated thrust force (the mark ● in FIG. 11) is calculated, and separately determine how much the estimated thrust force value in each case is reflected to an update of the rigidity table. For example, when a driver comparatively gently operates the brake pedal 5 like a normal brake operation, an estimated thrust force can be accurately calculated due to a gentle operation keeping the motor speed and the acceleration under a predetermined value. Therefore, in this case, the rigidity table generation processor 46 updates the rigidity table by calculating a rigidity table T1*a(i)* shown in FIG. 11 based on this estimated thrust force. On the other hand, when a driver applies a sudden brake operation, a calculated estimated thrust force has low accuracy due to a sudden change in the motor speed and the acceleration equal to or more than the predetermined value. Therefore, in this case, the rigidity table generation processor 46 does not update the rigidity table, and use a rigidity table T1*a(ii)* shown in FIG. 11. Further, the rigidity table generation processor 46 may adjust (update) the rigidity table between the rigidity table T1*a(i)* and the rigidity table T1*a(ii)* like the curves T1*a(iii)* and T1*a(iv)* as indicated by the double-headed circular arc arrow in FIG. 11, by relatively determining the accuracy of estimated thrust force (how high the motor speed and acceleration are). In this variation 2, similarly to the variation 1, it is possible to prevent generation of such an excessive change in the brake force that a driver has uncomfortable feeling.

[Variation 3 (Rigidity Table Update Method]

Figure 12:
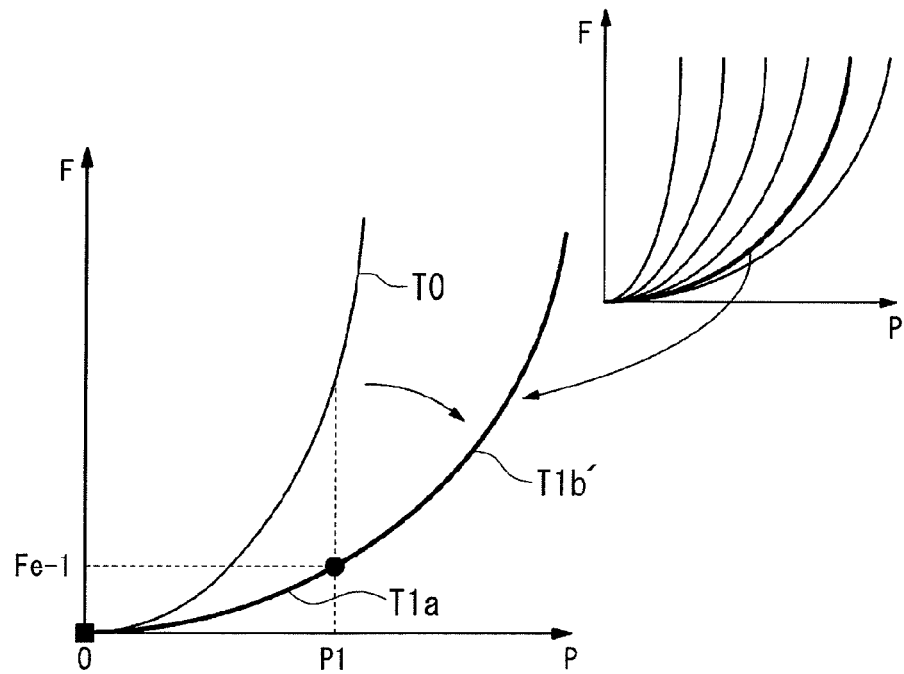
FIG. 12 illustrates a variation 3 for illustrating the method of updating the rigidity table after the position where the estimated thrust force value is calculated.

Further, the rigidity table generation processor 46 may generate the latter half updated rigidity table T1*b*' by the update method shown in FIG. 12 as a variation 3, instead of the above-mentioned rigidity table update method employed in the present embodiment, which forms the curve after the corrected motor rotational position P1 when the estimated thrust force value Fe-1 is calculated in the above-mentioned manner as shown in FIG. 9. More specifically, as shown in the left graph in FIG. 12, the rigidity table generation processor 46 may take into consideration the update result of the rigidity table T1*a* until the corrected motor rotational position P1 when the estimated thrust force value P1 is calculated, and complete (update) the curve so as to define a reasonable rigidity characteristic (for example, the pressing force increases according to an increase in the position). Alternatively, the rigidity table generation processor 46 may select a rigidity characteristic most coincided with the update result of the rigidity table T1*a* until the corrected motor rotational position P1 when the estimated thrust force value P1 is calculated, from separately prepared rigidity table list information [refer to the upper right corner of FIG. 12].

[Variation 4]

In the above-mentioned embodiment, the motor rotational position instruction value is calculated based on the updated rigidity table in step S6 shown in FIG. 4. Then, as shown in FIG. 6, after the calculation of the estimated thrust force, the motor rotational position instruction value is changed from the motor rotational position instruction value Pcom-0 obtained by using the pre-update rigidity table to the motor rotational position instruction value Pcom-1 obtained by using the updated rigidity table.

Figure 13:
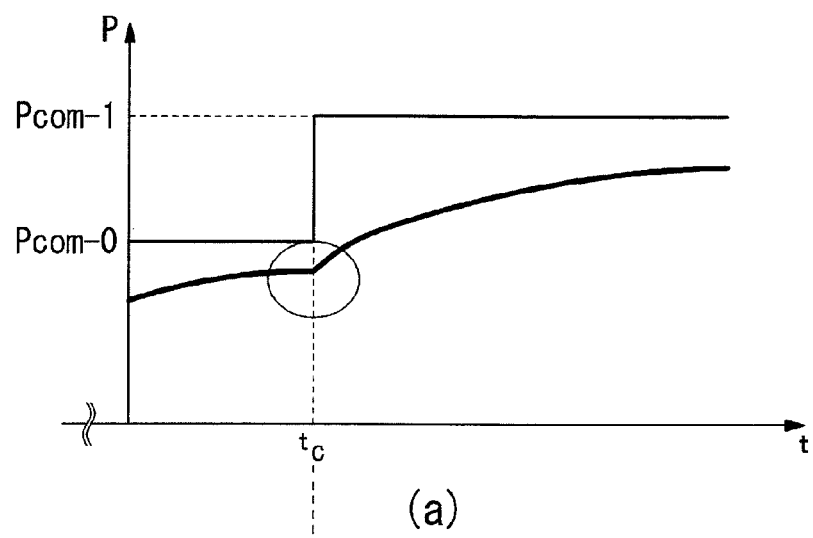
FIGS. 13(a) and 13(b) illustrate a variation 4 of the method of calculating the motor rotational position instruction, and in particular.
Figure 13:
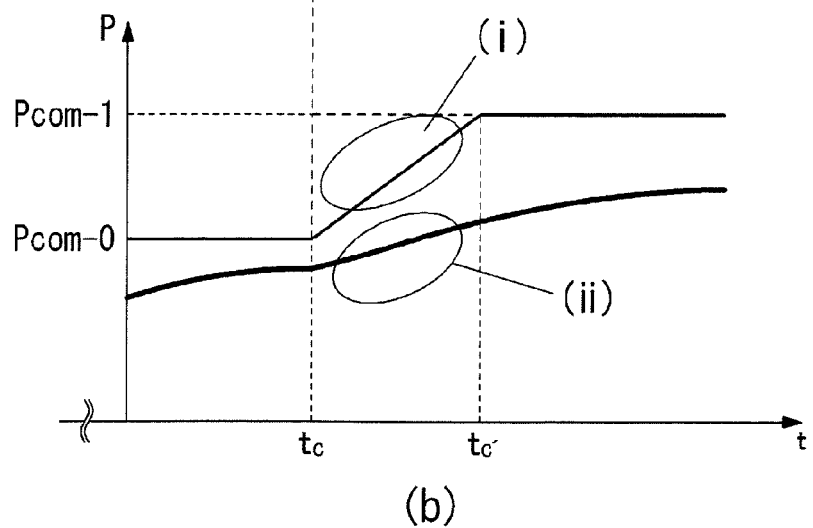

The motor rotational position instruction value may be calculated by the calculation method shown in FIG. 13 (*b*), instead of the method of calculating the motor rotational position instruction value employed by the above-mentioned embodiment shown in FIG. 7. The thin solid line in FIGS. 13(*a*) and 13(*b*) represents a change in the motor rotational position instruction value, and the heavy solid line represents a change in the motor rotational position. As shown in FIG. 13(*a*), if a difference between the rigidity tables before and after the update is large in the above-mentioned embodiment, this difference leads to a significant change in the motor rotational position instruction value at time tc (the timing of update of the motor rotational position instruction), i.e., a significant difference between the motor rotational position instruction values Pcom-0 and Pcom-1. As in this case, largely changing a motor rotational position instruction value in a position control of the electric motor 19 leads to a change in the motor speed. As a result, these changes affect a change in the brake force, thereby resulting in deterioration of brake operation feeling. Therefore, when the motor rotational position instruction value is significantly changed as shown in FIG. 13(*a*), i.e., when a significant difference is generated between the motor rotational position instruction values Pcom-0 and Pcom-1, as shown in FIG. 13(*b*), the influence to brake operation feeling may be reduced by limiting a change amount of the motor rotational position instruction value as indicated by the circle (i), or limiting a change in the motor speed as indicated by the circle (ii) within a certain time interval (time tc to tc'), thereby preventing deterioration of brake operation feeling for the above-mentioned reason.

According to the present embodiment, as mentioned above, even when the rigidity table T0 stored in the RAM 31 at the time of a start of a brake operation does not coincide with the actual rigidity characteristic (pressing force characteristic in relation to positions) of the electric caliper 4 which changes according to brake conditions including how often and how long a brake operation is applied, it is possible to reduce a deviation between a pressing force instruction value and a generated pressing force by updating the characteristic of the relation between the pressing force instruction value and rotational position (rigidity table) each time an estimated thrust force value is calculated during one brake operation. In other words, it is possible to steadily keep followability to a pressing force instruction according to an actual state of the rigidity characteristic of the electric caliper 4, thereby ensuring generation of an appropriate brake force. Further, updates (of the characteristic of the relation between the pressing force instruction value and rotational position) during one brake operation make it unnecessary to check and correct the rigidity table in advance, thereby preventing unnecessary generation of a pressing force.

The rigidity table (for example, Tn shown in FIG. 6) updated during one brake operation as mentioned above is used in a next brake operation actuated by an operation of the brake pedal 5 or actuated by the vehicle posture control apparatus. However, if a long time has passed from an update of the rigidity table to a next brake operation, for example, if the temperatures of the electric caliper 4 and the brake pads 9 are different from those at the time of update of the rigidity table (high temperatures are cooled down into low temperatures (normal temperatures)), as disclosed in Japanese Patent Application Public Disclosure No. 2008-184023, the motor rotational position instruction value may be obtained by the reference rigidity table T0 at the time of a start of a next brake operation. This reference rigidity table T0 is a rigidity table detected in the vehicle in a stopped state at the time of conformation of an actuation of the vehicle system, for example, at the time of a start of the vehicle engine.

Second Embodiment

In the above-mentioned first embodiment, as mentioned above, the ECU 33 includes the controller configured to convert a pressing force instruction value to a motor rotational position instruction value used in a control of the electric motor to calculate a supply electric current value, the thrust force information calculation unit configured to calculate thrust force information as an estimated thrust force value equivalent to a pressing force to the brake pads which is calculated based on electric current actually flowing through the electric motor, the update unit configured to update rigidity characteristic data as a table constituted by a relation between the estimated thrust force value and the electric motor rotational position, and the instruction value change unit configured to change the rotational position instruction value based on the pressing force instruction value according to the rigidity characteristic data updated by the update unit.

A second embodiment employs an electric current correction processor 43' as the above-mentioned thrust force information calculation unit. The electric current correction processor 43' calculates thrust force information as an electric current value, which corresponds to a pressing force applied to the brake pads, calculated based on electric current actually flowing through the electric motor at a predetermined rotational position of the electric motor which is detected by the rotational position detector. Further, the second embodiment employs a rigidity table generation processor 46' as the above-mentioned update unit. The rigidity table generation processor 46' updates rigidity characteristic data as a table constituted by the relation between the electric current value and the rotational position of the electric motor. Further, the second embodiment employs a motor-rotational-position-instruction-to-supply-electric-current-instruction-conversion processor 39' as the above-mentioned instruction value change unit. The motor-rotational-position-instruction-to-supply-electric-current-instruction-conversion processor 39' changes a supply electric current instruction value based on a rotational position instruction value according to the rigidity characteristic data updated by the update unit.

Figure 14:
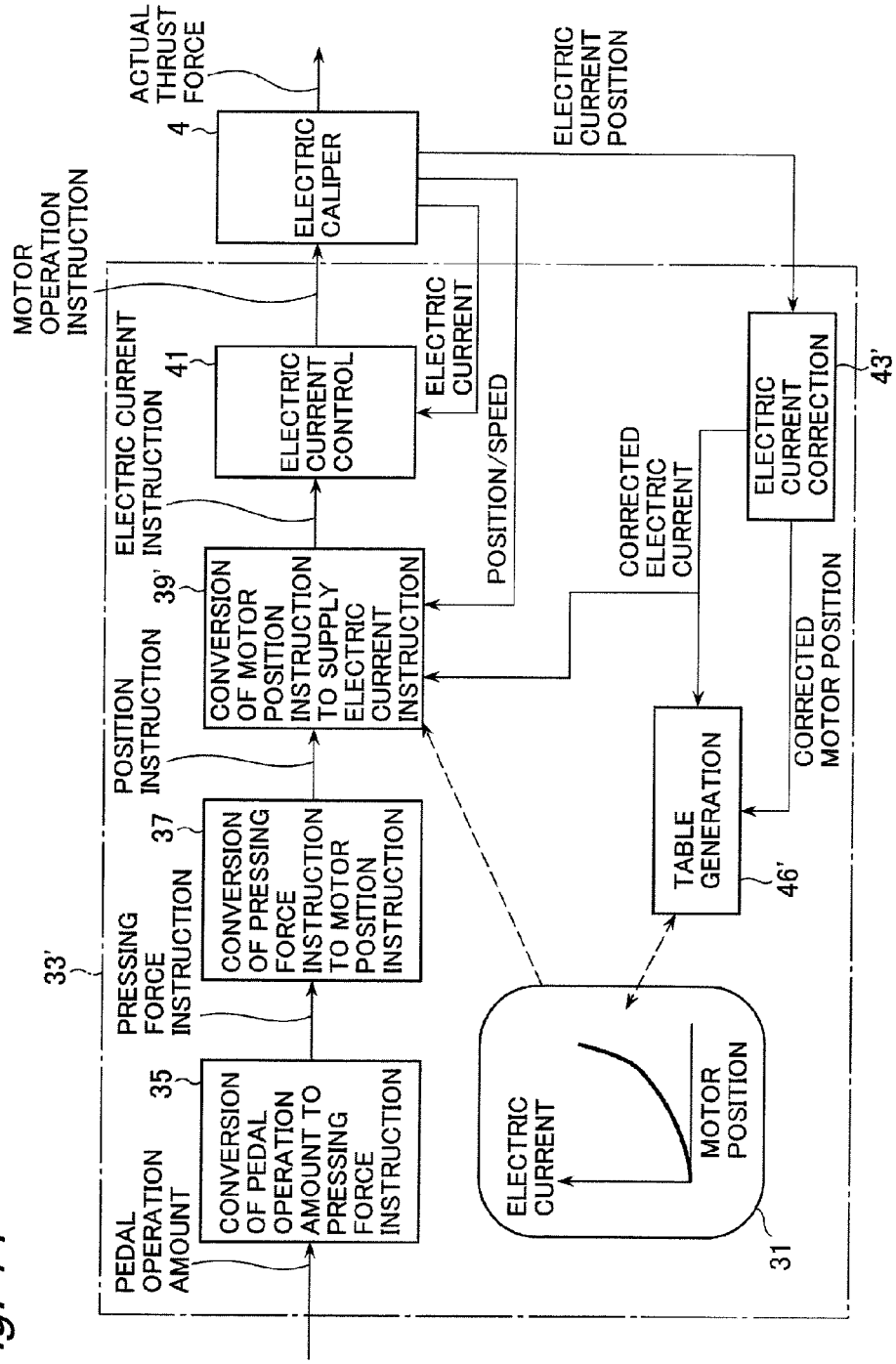
FIG. 14 is a functional block diagram of an ECU for illustrating a method for controlling an electric disk brake system according to a second embodiment of the present invention.

More specifically, as shown in FIG. 14, the ECU 33' includes the pedal-operation-amount-to-pressing-force-instruction-conversion processor 35, the pressing-force-instruction-to-motor-rotational-position-instruction-conversion processor 37, the motor-rotational-position-instruction-to-supply-electric-current-instruction-conversion processor 39', an electric current control processor 41', the electric current correction processor 43', and the rigidity table generation processor 46'. In the ECU 33', the respective processors function to generate an electric current instruction value supplied to the electric motor 19 from pedal operation information, i.e., calculate an electric current value supplied to the electric motor 19 from a pressing force instruction value to thereby apply electric current to the electric motor 19 accordingly.

Some of these processors are different from the counterparts in the first embodiment. The different ones are the motor-rotational-position-instruction-to-supply-electric-current-instruction-conversion processor 39', the electric current control processor 41', the electric current correction processor 43', and the rigidity table generation processor 46', processing of which will be described below.

The motor-rotational-position-instruction-to-supply-electric-current-instruction-conversion processor 39' calculates a supply electric current value based on a difference between a motor rotational position detected by the resolver 21 and the above-mentioned motor rotational position instruction value from the pressing-force-instruction-to-motor-rotational-position-instruction-conversion processor 37, and outputs it to the electric current control processor 41'.

The motor-rotational-position-instruction-to-supply-electric-current-instruction-conversion processor 39' calculates this supply electric current value by converting the above-mentioned motor rotational position instruction value into an electric current value based on the rigidity table which is rigidity characteristic data constituted by the relation between the electric current value and the rotational position of the electric motor which is stored in the RAM 31'. The electric current control processor 41' supplies electric current based on a motor operation instruction value which is the supply electric current value into the electric motor 19 in the electric caliper 4.

The electric current correction processor 43' calculates corrected electric current and a corrected motor rotational position, similarly to the electric current correction processor 43 in the first embodiment. Then, the electric current correction processor 43' outputs corrected electric current obtained by the electric current correction processing as thrust force information to the motor-rotational-position-instruction-to-supply-electric-current-instruction-conversion processor 39' and the rigidity table generation processor 46', and further outputs a corrected motor rotational position to the rigidity table generation processor 46'. In the second embodiment, this electric current correction processor 43' embodies the thrust force information calculation unit.

The rigidity table generation processor 46' generates an updated rigidity table by a similar method to the above-mentioned methods shown in FIGS. 6 to 13 at the timing when corrected electric current is calculated, with use of the corrected electric current as thrust force information obtained by the electric current correction processor 43' and a corrected motor rotational position. In this way, the rigidity table generation processor 46' updates the rigidity table which is rigidity characteristic data stored in the RAM 31'.

In this way, according to the second embodiment, even if corrected electric current is used as thrust force information, it is possible to change a supply electric current value as an instruction value based on the rigidity table which is rigidity characteristic data constituted by the relation between the electric current value and the rotational position of the electric motor. Therefore, similarly to the first embodiment, it is possible to reduce a deviation between a pressing force instruction value and a generated pressing force. In other words, it is possible to steadily keep followability to a pressing force instruction according to an actual state of the rigidity characteristic of the electric caliper 4, thereby ensuring generation of an appropriate brake force.

Third Embodiment

In a third embodiment, a pressing force instruction value is converted into a rotational position instruction value used in a control of the electric motor, and this rotational position instruction value is converted into a motor torque instruction value to the electric motor. After that, the motor torque instruction value is converted into a motor operation instruction as a supply electric current value. Further, the third embodiment employs an electric-current-to-motor-torque-conversion processor 45" as the thrust force information calculation unit. The electric-current-to-motor-torque-conversion processor 45" calculates thrust force information as an estimated motor torque value, which corresponds to a pressing force applied to the brake pads, calculated based on electric current actually flowing through the electric motor at a predetermined rotational position of the electric motor which is detected by the rotational position detector. Further, the third embodiment employs a rigidity table generation processor 46" as the update unit. The rigidity table generation processor 46" updates rigidity characteristic data as a table constituted by the relation between the estimated motor torque value and the rotational position of the electric motor. Further, the third embodiment employs a motor-rotational-position-instruction-to-motor-torque-instruction-conversion processor 39" as the instruction value change unit. The motor-rotational-position-instruction-to-motor-torque-instruction-conversion processor 39" changes a motor torque instruction value based on a rotational position instruction value according to the rigidity characteristic data updated by the update unit.

Figure 15:
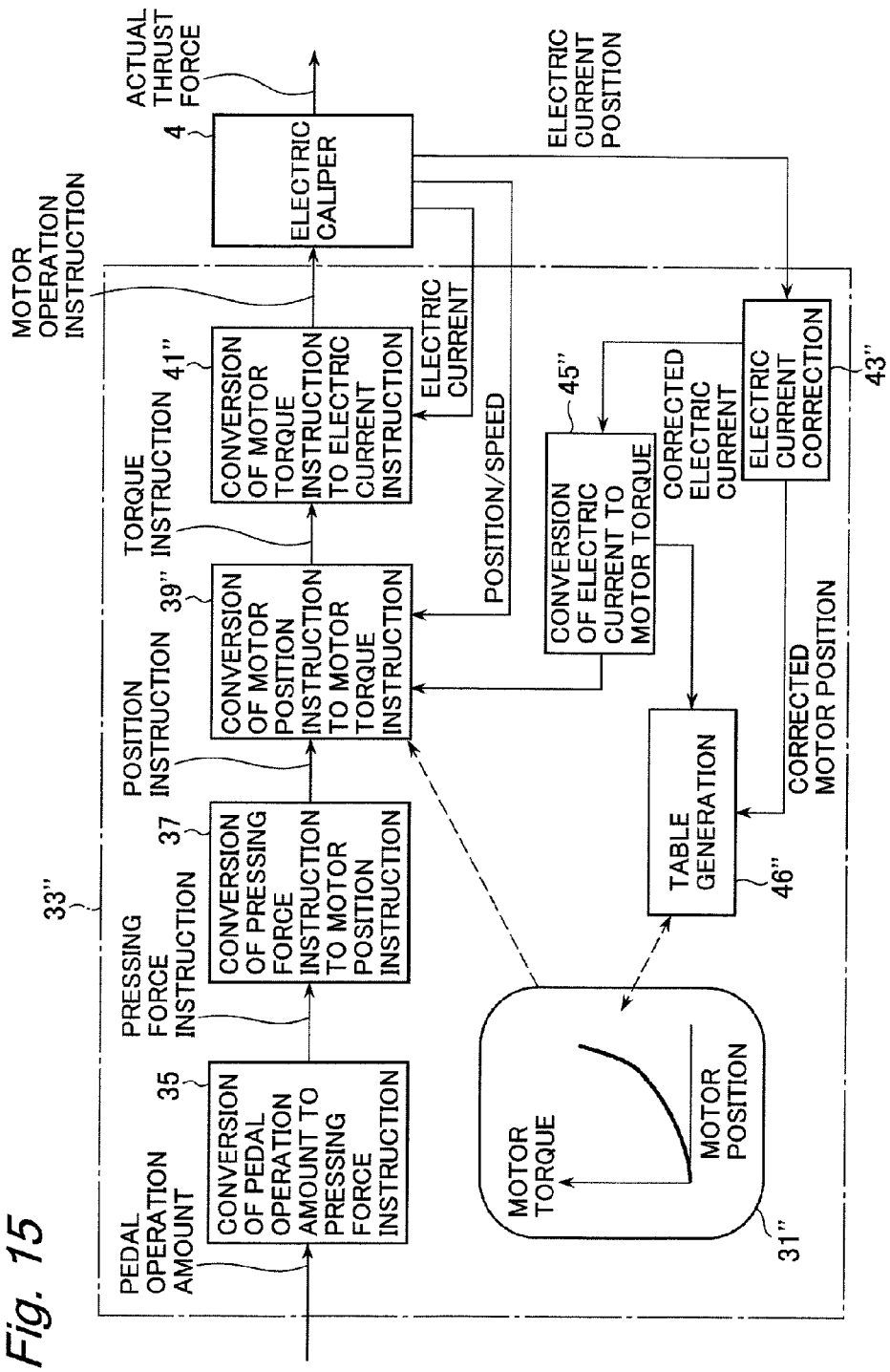
FIG. 15 is a functional block diagram of an ECU for illustrating a method for controlling an electric disk brake system according to a third embodiment of the present invention.

More specifically, as shown in FIG. 15, the ECU 33" includes the pedal-operation-amount-to-pressing-force-instruction-conversion processor 35, the pressing-force-instruction-to-motor-rotational-position-instruction-conversion processor 37, the motor-rotational-position-instruction-to-motor-torque-instruction-conversion processor, 39", a motor-torque-instruction-to-electric-current-instruction-conversion processor 41", an electric current correction processor 43", the electric-current-to-motor-torque-conversion processor 45", and the rigidity table generation processor 46". In the ECU 33', the respective processors function to generate an electric current instruction value supplied to the electric motor 19 from pedal operation information, i.e., calculate an electric current value supplied to the electric motor 19 from a pressing force instruction value to thereby apply electric current to the electric motor 19 accordingly.

Some of these processors are different from the counterparts in the first embodiment. The difference ones are the motor-rotational-position-instruction-to-motor-torque-instruction-conversion processor 39", the motor-torque-instruction-to-electric-current-instruction-conversion processor 41", the electric current correction processor 43", the electric-current-to-motor-torque-conversion processor 45", and the rigidity table generation processor 46", processing of which will be described below.

The motor-rotational-position-instruction-to-motor-torque-instruction-conversion processor 39" calculates an acceleration value based on a difference between a motor rotational position detected by the resolver 21 and a motor rotational position instruction value from the pressing-force-instruction-to-motor-rotational-position-instruction-conversion processor 37, and calculates a motor torque instruction value corresponding to this acceleration value to output the calculated motor torque instruction value to the motor-torque-instruction-to-electric-current-instruction-conversion processor 41". The motor-rotational-position-instruction-to-motor-torque-instruction-conversion processor 39" calculates this motor torque instruction value by converting a motor rotational position instruction vale into a motor torque based on the rigidity table which is rigidity characteristic data constituted by the relation between the motor torque and the rotational position of the electric motor stored in the RAM 31". Each time detection of an estimated motor torque value is input from the electric-current-to-motor-torque-conversion processor 45" which will be described later, the motor-rotational-position-instruction-to-motor-torque-instruction-conversion processor 39" outputs a motor torque instruction value converted based on the rigidity table stored in the RAM 31" at this time to output it to the motor-torque-instruction-to-electric-current-instruction-conversion processor 41".

The motor-torque-instruction-to-electric-current-instruction-conversion processor 41" calculates a motor operation instruction value which is a supply electric current value from a motor torque instruction value, and supply electric current based on this motor operation instruction value to the electric motor 19.

The electric current correction processor 43" calculates corrected electric current and a corrected motor rotational position, similarly to the electric current correction processor 43 in the first embodiment. Then, the electric current correction processor 43" outputs corrected electric current obtained by the electric current correction processing to the electric-current-to-motor-torque-conversion processor 45" and the rigidity table generation processor 46", and further outputs a corrected motor rotational position to the rigidity table generation processor 46".

The electric-current-to-motor-torque-conversion processor 45" calculates an estimated motor torque value which is thrust force information from corrected electric current output from the electric current correction processor 43. The electric-current-to-motor-torque-conversion processor 45" calculates this estimated motor torque value based on a motor torque constant and the mechanical efficiency of the caliper 4 obtained from pre-measurement. The calculated estimated thrust force is output from the electric-current-to-motor-torque-conversion processor 45" to the rigidity table generation processor 46" and the motor-rotational-position-instruction-to-motor-torque-instruction-conversion processor. 39".

In the third embodiment, the electric-current-to-motor-torque-conversion processor 45" embodies the thrust force information calculation unit.

The rigidity table generation processor 46" generates an updated rigidity table by a similar method to the above-mentioned methods shown in FIGS. 6 to 13 at the timing when an estimated motor torque value is calculated, with use of the estimated motor torque value as thrust force information obtained by the electric-current-to-motor-torque-conversion processor 45" and a corrected motor rotational position obtained by the electric current correction processor 43". In this way, the rigidity table generation processor 46' updates the rigidity table which is rigidity characteristic data stored in the RAM 31".

In this way, according to the third embodiment, even if an estimated motor torque value is used as thrust force information, it is possible to change a motor torque instruction value as an instruction value based on the rigidity table which is rigidity characteristic data constituted by the relation between the estimated motor torque value and the rotational position of the electric motor. Therefore, similarly to the first embodiment, it is possible to reduce a deviation between a pressing force instruction value and a generated pressing force. In other words, it is possible to steadily keep followability to a pressing force instruction according to an actual state of rigidity characteristic of the electric caliper 4, thereby ensuring generation of an appropriate brake force.

According to the electric brake apparatus described based on the first to third embodiments, the electric brake apparatus includes the caliper. The caliper includes the electric motor, the rotational position detector configured to detect a rotational position of the electric motor, and a pressing member configured to press the brake pads against the disk rotor and configured to be thrust by the electric motor. The electric brake apparatus further includes the controller configured to calculate a supply electric current value used in a control of the electric motor from rigidity characteristic data of the caliper based on a pressing force instruction value for a pressing force applied from the pressing member to the brake pad according to a brake instruction signal. The controller includes a thrust force information calculation unit configured to calculate thrust force information for a thrust force actually applied to the pressing member at a rotational position of the electric motor which is detected by the rotational position detector, an update unit configure to update rigidity characteristic data of the caliper based on the thrust force information and the rotational position of the electric motor each time the thrust force calculation unit calculates the thrust force information while the pressing force is pressing the brake pad during one brake operation, and an instruction value change unit configured to change an instruction value converted from the pressing force instruction value to calculate the supply electric current value based on the updated rigidity characteristic data each time the update unit updates the rigidity characteristic data of the caliper. Therefore, it is possible to ensure generation of an appropriate brake force according to a brake instruction such as a brake operation amount.

According to the above-described embodiments of the present invention, it is possible to ensure generation of an appropriate brake force according to a brake instruction such as a brake operation amount.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority to Japanese Patent Application No. 2010-081952 filed on Mar. 31, 2010. The entire disclosure of Japanese Patent Application No. 2010-081952 filed on Mar. 31, 2010 including specification, claims, drawings and summary is incorporated herein by reference in its entirety.

The entire disclosure of Japanese Patent Publication No. 2008-184023 including specification, claims, drawings and summary is incorporated herein by reference in its entirety.

What is claimed is:

1. An electric brake apparatus, comprising:
    a caliper main body including a pressing member configured to press a brake pad against a disk rotor;
    an electric motor disposed in the caliper main body and configured to thrust the pressing member;
    a rotational position detector configured to detect a rotational position of the electric motor; and
    a controller configured to calculate a supply electric current value used in control of the electric motor from data related to a rigidity characteristic of the caliper based on a pressing force instruction value for a pressing force applied from the pressing member to the brake pad according to a brake instruction signal,
    the controller comprising
    a thrust force information calculation unit configured to calculate thrust force information for a thrust force applied to the pressing member based on a supply electric current value supplied to the electric motor,
    an update unit configured to update the data related to the rigidity characteristic of the caliper based on the thrust force information and the rotational position of the electric motor, when the thrust force calculation unit calculates the thrust force information while the pressing member is pressing the brake pad during one brake operation, and
    an instruction value change unit configured to change an instruction value converted from the pressing force instruction value to calculate the supply electric current value based on the updated data related to the rigidity characteristic, when the update unit updates the data related to the rigidity characteristic of the caliper.

2. The electric brake apparatus according to claim 1, wherein
    the controller is configured to convert the pressing force instruction value into a rotational position instruction value used in the control of the electric motor, and to calculate the supply electric current value,
    the thrust force information calculation unit is configured to calculate an estimated thrust force value as the thrust force information, which estimated thrust force value corresponds to a pressing force applied to the brake pad, the estimated thrust force value being calculated based on electric current actually flowing through the electric motor,
    the update unit is configured to update the data related to the rigidity characteristic as data constituted by a relation between the estimated thrust force value and the rotational position of the electric motor, and
    the instruction value change unit is configured to change the rotational position instruction value based on the pressing force instruction value and the supply electric current value corresponding to the rotational position instruction value, according to the data related to the rigidity characteristic updated by the update unit.

3. The electric brake apparatus according to claim 1, wherein
the controller is configured to convert the pressing force instruction value into the rotational position instruction value used in the control of the electric motor, and is configured to convert the rotational position instruction value into the supply electric current instruction value supplied to the electric motor,
the thrust force information calculation unit is configured to calculate an electric current value as the thrust force information, which electric current value corresponds to a pressing force applied to the brake pad, the electric current value being calculated based on electric current actually flowing through the electric motor,
the update unit is configured to update the data related to the rigidity characteristic as data constituted by a relation between the electric current value and the rotational position of the electric motor, and
the instruction value change unit is configured to change the supply electric current instruction value based on the rotational position instruction value according to the data related to the rigidity characteristic updated by the update unit.

4. The electric brake apparatus according to claim 1, wherein
the controller is configured to convert the pressing force instruction value into the rotational position instruction value used in the control of the electric motor, and is configured to convert the rotational position instruction value into a motor torque instruction value supplied to the electric motor,
the thrust force information calculation unit is configured to calculate an estimated motor torque value as the thrust force information, which estimated motor torque value corresponds to a pressing force applied to the brake pad, the estimated motor torque value being calculated based on electric current actually flowing through the electric motor,
the update unit is configured to update the data related to the rigidity characteristic as data constituted by a relation between the estimated motor torque value and the rotational position of the electric motor, and
the instruction value change unit is configured to change the motor torque instruction value based on the rotational position instruction value according to the data related to the rigidity characteristic updated by the update unit.

5. The electric brake apparatus according to claim 1, wherein, when the thrust force calculation unit calculates the thrust force information, the update unit updates the data related to the rigidity characteristic by selecting one of a plurality of pieces of data related to the rigidity characteristic stored in advance based on the calculated thrust force information.

6. The electric brake apparatus according to claim 1, wherein, when the thrust force information calculation unit calculates the thrust force information, the update unit generates updated data related to the rigidity characteristic by generating rigidity characteristic data until the thrust force information as a curved line based on the calculated thrust force information and the rotational position of the electric motor, and complementing the updated data related to the rigidity characteristic from the data related to the rigidity characteristic used in the control of the electric motor at that time as data related to the rigidity characteristic after the thrust force information.

7. The electric brake apparatus according to claim 1, wherein the update unit is configured to generate updated data related to the rigidity characteristic by comparing data related to the rigidity characteristic generated based on the thrust force information and the rotational position of the electric motor with the data related to the rigidity characteristic before an update, and to adjust a change amount of a generated pressing force at the motor rotational position when the thrust force information is calculated from the data related to the rigidity characteristic before the update so that the change amount is maintained at a predetermined amount.

8. The electric brake apparatus according to claim 1, wherein the update unit is configured to generate updated data related to the rigidity characteristic based on at least one of a motor speed and a motor acceleration calculated from the rotational position of the electric motor which is detected by the rotational position detector.

9. An electric brake apparatus comprising:
a caliper including an electric motor, a rotational position detector configured to detect a rotational position of the electric motor, and a pressing member configured to press a brake pad against a disk rotor by being thrust by the electric motor; and
a controller configured to calculate a supply electric current value used in control of the electric motor from data related to a rigidity characteristic of the caliper based on a pressing force instruction value for a pressing force applied from the pressing member to the brake pad according to a brake instruction signal,
the controller comprising
a thrust force information calculation unit configured to calculate thrust force information for a thrust force applied to the pressing member based on a supply electric current value supplied to the electric motor,
an update unit configured to, when the thrust force information calculation unit calculates the thrust force information while the pressing member is pressing the brake pad during one brake operation, update the data related to the rigidity characteristic of the caliper by separately generating characteristic data until the thrust force information and the characteristic data after the thrust force information for the data related to the rigidity characteristic of the caliper based on the thrust force information and the rotational position of the electric motor, and combining the generated pieces of the characteristic data, and
an instruction value change unit configured to, when the update unit updates the data related to the rigidity characteristic of the caliper, change an instruction value converted from the pressing force instruction value to calculate the supply electric current value based on the updated data related to the rigidity characteristic.

10. The electric brake apparatus according to claim 9, wherein the controller in configured to convert the pressing force instruction value into a rotational position instruction value used in the control of the electric motor, and to calculate the supply electric current value,
the thrust force information calculation unit is configured to calculate an estimated thrust force value as the thrust force information, which estimated thrust force value corresponds to a pressing force applied to the brake pad, the estimated thrust force value being calculated based on electric current actually flowing through the electric motor,
the update unit is configured to update the data related to the rigidity characteristic as data constituted by a relation between the estimated thrust force value and the rotational position of the electric motor, and the instruction value change unit changes the rotational position instruction value based on the pressing force instruction value and the supply electric current value corresponding to the rotational position instruction value, according to the data related to rigidity characteristic updated by the update unit.

11. The electric brake apparatus according to claim 9, wherein the controller is configured to convert the pressing force instruction value into the rotational position instruction value used in the control of the electric motor, and to convert the rotational position instruction value into the supply electric current instruction value supplied to the electric motor, the thrust force information calculation unit is configured to calculate an electric current value as the thrust force information, which electric current value corresponds to a pressing force applied to the brake pad, the electric current value being calculated based on electric current actually flowing through the electric motor, the update unit is configured to update the data related to the rigidity characteristic as data constituted by a relation between the electric current value and the rotational position of the electric motor, and the instruction value change unit is configured to change the supply electric current instruction value based on the rotational position instruction value according to the data related to rigidity characteristic updated by the update unit.

12. The electric brake apparatus according to claim 9, wherein the controller is configured to convert the pressing force instruction value into the rotational position instruction value used in the control of the electric motor, and to convert the rotational position instruction value into a motor torque instruction value supplied to the electric motor, the thrust force information calculation unit is configured to calculate an estimated motor torque value as the thrust force information, which estimated motor torque value corresponds to a pressing force applied to the brake pad, the estimated motor torque value being calculated based on electric current actually flowing through the electric motor, the update unit is configured to update the data related to the rigidity characteristic as data constituted by a relation between the estimated motor torque value and the rotational position of the electric motor, and the instruction value change unit is configured to change the motor torque instruction value based on the rotational position instruction value according to the data related to the rigidity characteristic updated by the update unit.

13. The electric brake apparatus according to claim 9, wherein, when the thrust force information calculation unit calculates the thrust force information, the update unit generates updated data related to the rigidity characteristic by generating data related to the rigidity characteristic until the thrust force information as a curved line based on the calculated thrust force information and the rotational position of the electric motor, and complementing the updated data related to the rigidity characteristic from the data related to the rigidity characteristic used in the control of the electric motor at that time as data related to the rigidity characteristic after the thrust force information.

14. The electric brake apparatus according to claim 9, wherein the update unit is configured to generate updated data related to the rigidity characteristic by comparing data related to the rigidity characteristic generated based on the thrust force information and the rotational position of the electric motor with the data related to the rigidity characteristic before an update, and to adjust a change amount of a generated pressing force at the motor rotational position when the thrust force information is calculated from the data related to the rigidity characteristic before the update so that the change amount is maintained at a predetermined amount.

15. The electric brake apparatus according to claim 9, wherein the update unit is configured to generate updated data related to the rigidity characteristic based on at least one of a motor speed and a motor acceleration calculated from the rotational position of the electric motor which is detected by the rotational position detector.

16. An electric brake apparatus, comprising:
a caliper main body including a pressing member configured to press a brake pad against a disk rotor;
an electric motor disposed in the caliper main body and configured to thrust the pressing member;
a rotational position detector configured to detect a rotational position of the electric motor; and
a controller configured to calculate a supply electric current value used in control of the electric motor from data related to a rigidity characteristic of the caliper based on a brake instruction signal,
the controller comprising
an update unit configured to update data related to the rigidity characteristic of the caliper based on the supply electric current value supplied to the electric motor and the rotational position of the electric motor, while the pressing member is pressing the brake pad during one brake operation, and
wherein the controller changes the supply electric current value supplied to the electric motor based on the updated data related to the rigidity characteristic, when the update unit updates the data related to the rigidity characteristic of the caliper.

17. The electric brake apparatus according to claim 16, wherein the controller is configured to calculate the supply electric current value corresponding to the rotational position instruction value used in the control of the electric motor based on the braking instruction signal,
the controller comprises
an electric current correction unit configured to calculate corrected electric current required to thrust the pressing member based on electric current flowing through the electric motor, and a corrected motor rotational position of the electric motor when the corrected electric current flows, and
an electric current to thrust force conversion unit configured to calculate an estimated thrust force value thrusting the pressing member based on the corrected electric current calculated by the electric current correction unit,
the update unit comprises
a rigidity characteristic data generation unit configured to generate the data related to the rigidity characteristic of the caliper based on the estimated thrust force value and the corrected motor rotational position each time the electric current to thrust force conversion unit calculates the estimated thrust force value while the pressing member is pressing the brake pad during one brake operation, and
a rigidity characteristic data update unit configured to update the data related to the rigidity characteristic into the generated data related to the rigidity characteristic when the rigidity characteristic data generation unit generates the data related to the rigidity characteristic of the caliper, and the controller further comprises an instruction value change unit configured to change the rotational position instruction value based on the brake instruction signal and the supply electric current value corresponding to the rotational position instruction value to calculate the supply electric current value based on the updated data related to the rigidity characteristic each time the update unit updates the data related to the rigidity characteristic of the caliper.

18. The electric brake apparatus according to claim 16, wherein the controller is configured to calculate the supply electric current value corresponding to a rotational position instruction value used in the control of the electric motor based on the brake instruction signal, and to calculate an estimated thrust force, which estimated thrust force value corresponds to a pressing force applied to the brake pad, based on the supply electric current value to the electric motor, the update unit is configured to update the data related to the rigidity characteristic as data constituted by a relation between the estimated thrust force value and the rotational position of the electric motor, and the controller is configured to change the rotational position instruction value based on the brake instruction signal and the supply electric current value corresponding to the rotational position instruction value, according to the data related to the rigidity characteristic updated by the update unit.

19. The electric brake apparatus according to claim 16, wherein the controller is configured to calculate the rotational position instruction value used in the control of the electric motor based on the brake instructional signal, and to convert the rotational position instruction value into the supply electric current instruction value supplied to the electric motor, and the controller is configured to change the supply electric current instruction value based on the rotational position instruction value according to the data related to the rigidity characteristic updated by the update unit.

20. The electric brake apparatus according to claim 16, wherein the controller is configured to calculate the rotational position instruction value used in the control of the electric motor based on the brake instruction signal, and to convert the rotational position instruction value into a motor torque instruction value supplied to the electric motor, and to calculate an estimated motor torque value, which estimated motor torque value corresponds to a pressing force applied to the brake pad, the estimated motor torque value being calculated based on electric current actually flowing through the electric motor, the update unit is configured to update the data related to the rigidity characteristic data as data constituted by a relation between the estimated motor torque value and the rotational position of the electric motor, and the controller is configured to change the motor torque instruction value based on the rotational position instruction value according to the data related to the rigidity characteristic updated by the update unit.

* * * * *